(12) United States Patent
Wang

(10) Patent No.: US 9,938,173 B2
(45) Date of Patent: Apr. 10, 2018

(54) APPARATUS FOR WATER, WASTEWATER, AND WASTE TREATMENT

(71) Applicant: Jianmin Wang, Rolla, MO (US)

(72) Inventor: Jianmin Wang, Rolla, MO (US)

( * ) Notice: Subject to any disclaimer, the term of this patent is extended or adjusted under 35 U.S.C. 154(b) by 878 days.

(21) Appl. No.: 13/891,830

(22) Filed: May 10, 2013

(65) Prior Publication Data
US 2014/0158614 A1 Jun. 12, 2014

Related U.S. Application Data

(63) Continuation-in-part of application No. 13/567,850, filed on Aug. 6, 2012, now abandoned.

(60) Provisional application No. 61/515,855, filed on Aug. 6, 2011, provisional application No. 61/515,967, filed on Aug. 7, 2011, provisional application No. 61/521,653, filed on Aug. 9, 2011, provisional application No. 61/525,760, filed on Aug. 20, 2011.

(51) Int. Cl.
| | |
|---|---|
| *C02F 3/30* | (2006.01) |
| *C02F 3/02* | (2006.01) |
| *F17D 1/00* | (2006.01) |
| *C02F 3/12* | (2006.01) |
| *C02F 3/22* | (2006.01) |

(52) U.S. Cl.
CPC ............ *C02F 3/308* (2013.01); *C02F 3/02* (2013.01); *C02F 3/1284* (2013.01); *C02F 3/301* (2013.01); *F17D 1/00* (2013.01); *C02F 3/223* (2013.01); *Y02W 10/15* (2015.05)

(58) Field of Classification Search
None
See application file for complete search history.

(56) References Cited

U.S. PATENT DOCUMENTS

| | | | | |
|---|---|---|---|---|
| 5,217,617 A | * | 6/1993 | Duncan | B01D 19/02 210/194 |
| 6,569,338 B1 | * | 5/2003 | Ozyboyd | C02F 3/1242 210/195.4 |
| 7,014,769 B1 | * | 3/2006 | Cox | C02F 3/1247 210/614 |
| 2001/0045390 A1 | | 11/2001 | Kim et al. | |
| 2002/0113011 A1 | | 8/2002 | Ricketts | |

(Continued)

*Primary Examiner* — Chester T Barry
(74) *Attorney, Agent, or Firm* — David E. Novak; Brannon Sowers & Cracraft PC

(57) ABSTRACT

Described herein are methods and devices for biologically treating water and/or wastewater. The methods and devices for treating wastewater may be enhanced using an surge lifting device which moves water and/or solids using volumes of air (for liquid transfer and mixing) and the automatic sludge return mechanism, combined with alternating aeration on and off operation to achieve comprehensive nitrogen and phosphorus removal. This surge lifting device can provide occasional surges of water using large bubbles which are able to move great volume of liquid while minimizing dissolved oxygen transfer to the surrounding liquid. Use of the devices and processes herein provides a simple, eloquent approach to wastewater treatment with less operation and maintenance costs than conventional devices and/or processes. The same surge lifting device can also be installed in an anaerobic digester, and use the biogas generated below the device to automatically mix the digester, without external energy input.

2 Claims, 20 Drawing Sheets

(56) References Cited

U.S. PATENT DOCUMENTS

2005/0098497 A1  5/2005 Khudenko
2006/0081533 A1* 4/2006 Khudenko ............... C02F 3/06
                                                    210/607

* cited by examiner

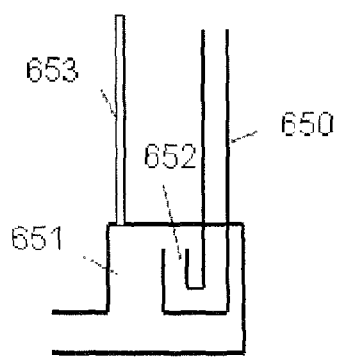
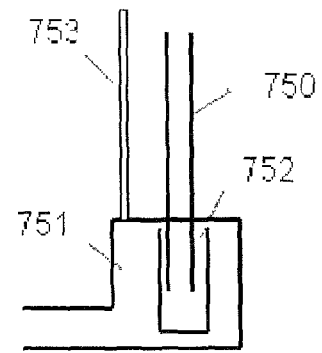
Fig. 14     Fig. 15
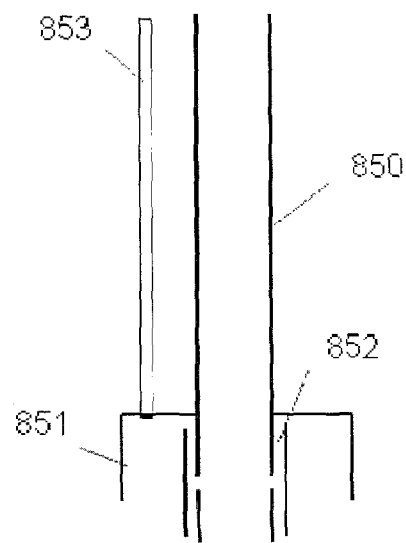
Fig. 16

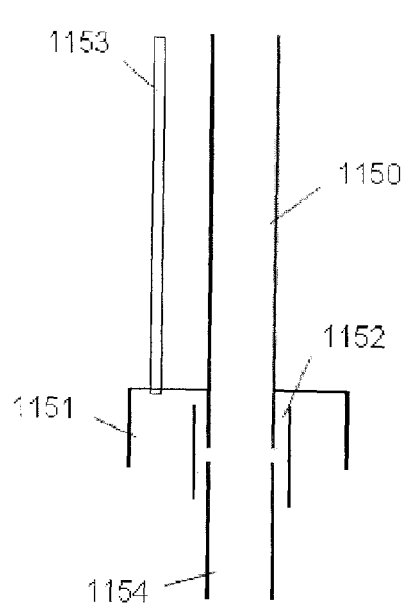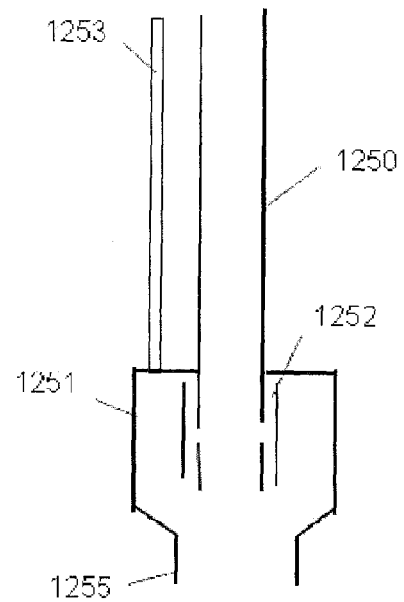
Fig. 19                    Fig. 20
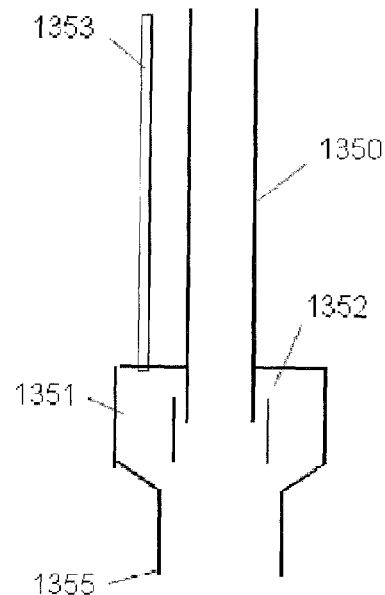
Fig. 21

APPARATUS FOR WATER, WASTEWATER, AND WASTE TREATMENT

CROSS-REFERENCE TO RELATED APPLICATIONS

This application is a Continuation-in-Part of and claims priority to U.S. patent application Ser. No. 13/567,850, filed Aug. 6, 2012, which claims priority to U.S. Provisional Patent Application No. 61/515,855, filed Aug. 6, 2011; U.S. Provisional Patent Application No. 61/515,967, filed Aug. 7, 2011; U.S. Provisional Patent Application No. 61/521,653, filed Aug. 9, 2011; and U.S. Provisional Patent Application No. 61/525,760, filed Aug. 20, 2011.

BACKGROUND

The wastewater containing organic pollutants is usually treated using a biological process. The suspended-growth process, which is also known as the activated sludge process, is one of the most widely used biological processes. For example, most municipal wastewater treatment plants employ the activated sludge process in their secondary treatment stage for removing organic pollutants from the wastewater. The conventional activated sludge process comprises a suspended-growth bioreactor (conventionally referred as the aeration tank when operated in aerobic conditions) and a detached clarifier (conventionally referred as the secondary clarifier). The wastewater and the return activated sludge from the clarifier flow into the aeration tank. Air or oxygen is supplied to the aeration tank through an aeration system. In the aeration tank, pollutants are either degraded or adsorbed by the activated sludge. The aeration tank mixed liquor then enters the secondary clarifier for solid-liquid separation. The supernatant of the secondary clarifier is discharged through the clarifier outlet. Most of the settled sludge in the clarifier is returned back to the aeration tank. Excess sludge is wasted to a sludge handling system for further treatment. Wasted sludge or high concentrated wastewater can be treated using anaerobic method to produce biogas while reducing pollutant load. The fixed-film process, which uses fixed or moving media to retain microorganisms, have also been widely used for wastewater treatment. The fixed-film process normally does not rely on the sludge return from the secondary clarifier to maintain appropriate amount of biomass for wastewater treatment.

In most cases, the wastewater also contains organic nitrogen, ammonia, and phosphorus. They are called wastewater nutrients because they can cause the excessive growth of algae in the receiving water body, e.g. eutrophication, significantly impacting the surface water quality. In addition, the organic nitrogen and ammonia consume oxygen in the receiving water body during their oxidation. These wastewater nutrients can also be removed in the bioreactor. Microorganisms can convert organic nitrogen and ammonia to nitrate or nitrite under aerobic conditions. This process is called nitrification. If the bioreactor or part of the reactor is under anoxic conditions (no dissolved oxygen (DO) presents), microorganisms can reduce the nitrate and nitrite to nitrogen gas. This process is called denitrification. If the bioreactor is maintained in low DO aerobic conditions, simultaneous nitrification/de-nitrification can be achieved. If the aerobic sludge continuously passes through an anaerobic zone then an aerobic zone in the bioreactor, a group of microorganisms favorable for phosphorus uptake can be acclimated.

The combination of nitrification/denitrification processes can be achieved in a number of ways. The conventional method includes a bioreactor and a secondary clarifier. The bioreactor includes two zones or two individual tanks: an aerobic zone/tank for nitrification, and an anoxic zone/tank for denitrification. Activated sludge is returned from the clarifier to the bioreactor to maintain a certain amount of biomass for nitrification and denitrification. If the anoxic zone is ahead of the aerobic zone, it is called a "pre-anoxic" process. For this process, organic matter in the influent is used as the electron donor for denitrification, thereby removing some organic matter during denitrification. However, this process relies on the return of final sludge and/or mixed liquor to provide nitrate to the anoxic zone. Therefore, only the nitrite/nitrate contained in these return streams can be removed. A certain fraction of the nitrate/nitrite in the aerobic zone (depending on the return ratio) is never returned to the anoxic zone, which limits the extent of denitrification. If the aerobic zone is ahead of the anoxic zone, it is called a "post-anoxic" process. This process cannot use influent organic carbon for denitrification. Therefore, the denitrification rate is generally very slow and an external carbon source is usually added to promote denitrification. Carbon addition increases operational complexity and cost.

The step-feed/step-aeration process is also used to perform nitrification and denitrification. In this process the bioreactor is separated into several sequential anoxic/aerobic sections. Aeration is provided in aerobic sections to perform nitrification. However, raw wastewater is fed into each of the anoxic sections and mixed with the nitrified mixed liquor from the preceding aerobic section for denitrification. This process can use the organic matter in the raw wastewater for denitrification. However, sludge return from a secondary clarifier to the first anoxic zone is needed to provide sufficient biomass for both nitrification and denitrification.

There is also an alternating anoxic-aerobic (AAA) process for total nitrogen removal. In this process the bioreactor is not separated into different sections, but rather creates aerobic and anoxic conditions within the same volume at different times. Aeration is applied to create the aerobic condition, and nitrification/organic matter removal are accomplished. Aeration is then ceased and anoxic condition begins. During the anoxic condition inflow commences, and denitrification is performed. Again this process requires a secondary clarifier for solids-liquid separation and a separate sludge return system to seed the bioreactor for biological reactions.

The simultaneous nitrification/denitrification process is also used to perform nitrification and denitrification within one tank. In this process, the entire tank is maintained under a low DO condition so that anoxic conditions can be maintained inside the flocs of activated sludge, allowing the nitrate/nitrite that has diffused into the flocs to be denitrified. However, it is not easy to maintain precise DO concentrations, and a complex control system must be used. In addition, low DO reduces the rate of nitrification. This process also requires a secondary clarifier to perform solids-liquid separation and a separate sludge return system to seed the bioreactor.

The sequencing batch reactor (SBR) can achieve nitrification, denitrification, and solids-liquid separation within one tank. During the aeration period nitrification occurs, while denitrification occurs during the feeding and mixing period. Sludge is settled and retained within the same tank during the settling period. However, after nitrification a fraction of the nitrate in the supernatant must be decanted to allow a new feeding cycle to begin. The effluent nitrate concentration is dependent on the influent total nitrogen concentration and the fraction of feed volume to total tank volume in one cycle. Therefore, only the portion of nitrate in the tank after decanting can be denitrified. Due to the use of the mechanical decanting system inherent to the SBR process, frequent but small volume decanting and feeding, which is essential to reduce the final effluent nitrate concentration, is not possible; therefore the total effluent nitrate concentration cannot be maintained at desirably low level. Moreover, the decanting process uses many mechanical moving parts, all of which can be problematic for operation.

To remove both nitrogen and phosphorus, more complex processes have to be used. These processes include an anaerobic zone to culture phosphorus accumulating organisms (PAOs), an anoxic zone to denitrify nitrate and nitrite, and an aerobic zone to oxidize organic pollutants and perform nitrification. Sludge is returned from the secondary clarifier to the bioreactor for needed biodegradation reactions.

FIG. 1 shows a conventional pre-anoxic process for total nitrogen removal. It has an anoxic zone for denitrification followed by an aerobic zone for organic matter degradation and nitrification. Mixed liquor in the aerobic zone is forcibly returned to the anoxic zone to provide nitrate. The effluent from the aerobic zone flows through a secondary clarifier for solids-liquid separation, and settled sludge in the secondary clarifier is returned to the anoxic zone to provide appropriate amount of biomass needed for biological functions. Supernatant in the secondary clarifier is discharged. The anoxic zone is continuously mixed, mostly through mechanical mixing devices.

FIG. 2 shows a conventional step-feed process for comprehensive nitrification and denitrification. It includes several sections or zones that alternatively perform denitrification and nitrification. Similar to the pre-anoxic process, it has a separate secondary clarifier and sludge is returned from the secondary clarifier to the first anoxic zone, and all anoxic zones are continuously mixed, mostly through mechanical mixing devices. The influent is fed to multiple anoxic zones to reduce the amount of nitrate produced in the following aerobic zone, and to provide carbon source for denitrification. This process can achieve better total nitrogen removal.

FIG. 3 shows a conventional anaerobic-anoxic-oxic ($A^2O$) process for total nitrogen and phosphorus removal. It has an anaerobic zone for culturing PAOs, an anoxic zone for denitrification, and an aerobic zone for organic matter degradation and nitrification. Mixed liquor in the aerobic zone is forcibly returned to the anoxic zone to provide nitrate. The effluent from the aerobic zone flows through a secondary clarifier for solids-liquid separation, and settled sludge in the secondary clarifier is returned to the anaerobic zone to provide appropriate amount of biomass needed for biological functions. Supernatant in the secondary clarifier is discharged. The anaerobic zone and anoxic zone are continuously mixed, mostly through mechanical mixing devices. The bioreactor used in the University of Cape Town (UCT) process also has three zones, however, the activated sludge in the clarifier is returned to the anoxic zone to remove nitrate, and the denitrified mixed liquor from the anoxic zone is returned to the anaerobic zone to culture PAOs. Compared to the conventional $A^2O$ process, the UCT process adds one more return stream but maintains a better anaerobic condition in the anaerobic zone.

FIG. 4 shows a bioreactor such as is disclosed in U.S. Pat. No. 6,787,035 that has been designed with an internal settling device (24, 26, 28, 30) to automatically return sludge to the aerobic zone (18). This system uses an aerobic zone (18) for organic matter removal and nitrification, and returns a portion of the liquor to an open bottom pre-anoxic zone (16) for denitrification. Supplemental sludge is returned from final clarifier (36) back to the bioreactor through a sludge return device (38). During normal operation, influent is continuously fed to the bioreactor and the aeration device (22) is continuously operated to charge oxygen to the bioreactor.

Anaerobic digesters have been used in many areas of the world to produce biogas for cooking, heating, and electricity using human and animal wastes, high strength wastewater, and sludge. The major component of an anaerobic digester is a sealed tank. This tank receives and digests organic matter under anaerobic conditions. During digestion microorganisms convert the organic matter to biogas after several metabolic steps. The key difference between a high-rate anaerobic digester and a conventional anaerobic digester is mixing. Appropriate mixing can significantly improve the digestion performance because it provides better contact between the microorganisms and the organic materials, prevents the sludge build up, and breaks apart floating sludge. For large installations, high-rate anaerobic digesters are normally used. A number of mixing methods such as mechanical mixing and gas mixing have been applied. These mixing types usually need external energy input and periodic maintenance. For example, mechanical mixing requires impellers and motors. Gas mixing, although relatively mild, still requires a gas compressor to recycle the biogas to the bottom of the tank. For small installations (such as those used in households and small communities), however, it is not cost-effective to employ these mixing methods. In particular, the application of these mixing methods is not possible in regions where there is no electricity. As a result, only bulky conventional anaerobic digesters, which do not have deliberated mixing systems, are used as biogas generators.

The effort to install conventional, non-mixed anaerobic digesters for small installations is significant. The key roadblock for mass implementation of these conventional digesters is their large size. Large tank volumes require large footprints and significant cost for construction, and these tanks need to be constructed onsite in most cases. Large tanks are also prone to leaking—and biogas leaking is the primary cause of biogas generator failure. Large tank designs are required because of the low reaction rate due to the lack of appropriate mixing. Only very mild mixing exists, caused naturally by the rising of small biogas bubbles.

While some past iterations of anaerobic digesters have relied on propeller-type mixing devices inserted into the tank, prior art shows improvements to mixing within anaerobic digesters using draft tube mixing units. The draft tube mixing unit typically contains a self-contained, propeller-type agitator that induces flow from the top of the tank, just below the liquid's surface, to the bottom of the tank. If more than one draft tubes are utilized in a single tank then the outlets of the draft tubes are aligned in a way as to induce a vortex with in the reactor. This provides two crucial functions: first, as previously mentioned, turbulence within the reactor increases contact frequency between microbes and substrate, increasing metabolic activity and gas production; secondly, agitation of the surface can break apart floating sludge and reintroduce it to the mixture. Too much floating sludge can create operational issues for anaerobic digesters including decreased gas production and clogging of effluent pipes.

High-efficiency, completely-mixed anaerobic digesters have a smaller reactor size for the same biogas yield. A portable anaerobic digester capable of high-efficiency anaerobic digestion typically has components of similar reactors (i.e., influent pipe, effluent pipe, sludge wasting pipe, etc.). Such reactors may use a single impeller or multiple impellers to lift solids from the bottom of the reactor and distribute them across the top of the reactor, which also has the effect of breaking apart any floating sludge. Other types of common mixing devices may also be used, such as a draft tube, injected gas, vacuum pumping, mixing blades and the like. The effluent port is typically positioned below the level of the fluid to minimize clogging occurrence as the result of floating sludge. Although this type of reactor is able to achieve higher biogas generation per volume of reactor over conventional non-mixed designs, the net energy output of the reactor is reduced due to the energy input needed to drive the mixing mechanism.

Fluids or fluid-like substances are often transported against gravity by the use of mechanical devices that provide positive and negative displacement (e.g., diaphragm pumps) or that apply kinetic energy directly to the fluid (e.g., centrifugal pumps). These types of devices often have many mechanical moving parts and, therefore, require significant amounts of maintenance.

Traditional airlift pumps can also be used to move and mix fluids. The traditional airlift pump has several advantages over mechanical pumps in that they generally have no moving parts in the pump that can fail due to mechanical wear. An air source provides the driving force in the pump, allowing for easy or no pump maintenance. Furthermore, airlift pumps are robust, light, and easy to install and transport compared to their mechanical counterparts. In a traditional airlift pump, when gas is introduced into a riser the density of the fluid in the riser is decreased, allowing for liquid and solids transport from the bottom to the top of the riser.

Conventional airlift pumps have disadvantages as well. Perhaps the most significant is the inability to apply a great deal of head or pressure to the fluid. In addition, airlift pumps are limited by relatively small pump housing diameters therefore may not able to achieve high flow rates. If the pump housing of an airlift pump has a large diameter, than the air bubbles within the housing are relatively more dispersed and can not form large bubbles within the housing. Therefore, lifting force is reduced with an increase of the pump housing diameter.

If there is a method and apparatus that can form large air or gas bubbles within the pipe to lift the liquid, the pump performance would be improved. In addition, the pump housing diameter can be increased without losing lifting force, thus achieving higher flow rates. The intensive lifting force caused by the large air or gas bubble can also be used for mixing the fluid within various types of reactors. Some methods for improving the efficiency of airlift pumps do so by introducing air to an airlift pump so as to allow the gas to accumulate in a volume under the liquid surface. Once the gas reaches a predetermined volume a large bubble of gas enters the pump riser through an orifice. Such devices may be thought of as "surge lift" devices as they collect a predetermined volume of gas and release it in a single "surge" to improve performance. The large bubble expands as it rises due to decreasing fluid pressure. As the bubble expands it fills the entire riser, creating a much greater force than the small bubbles in a traditional airlift pump. In other methods a gas supply line has been added to allow the pump to operate as a traditional airlift pump between large-bubble surges, effectively increasing overall flow rate. All of these previous methods for increasing the efficiency of an airlift pump include an elbow-shaped means of introducing the air from the air chamber to the riser. In certain applications this means of air introduction could become clogged and result in pump failure.

SUMMARY

The claimed technology is set forth in the claims below, and the following is not in any way to limit, define or otherwise establish the scope of legal protection.

One embodiment of the disclosed invention is a bioreactor and method that has an internal biomass retention mechanism to replace the conventional sludge return from the final clarifier for treating water and wastewater, and comprises one or more mixing zones that are operated under anaerobic or anoxic conditions, an aerobic zone for nitrification and organic matter removal, an open- or closed-bottom static zone for sludge settling and thickening, a means to return settled sludge from the static zone to an upstream zone, or between mixing and aerobic zones. A series of mixing zones can be applied to increase treatment effectiveness for denitrification and/or phosphorus removal. The mixing within the different zones may be accomplished by an air-driven surge lifting device.

Another embodiment of the disclosed invention is a bioreactor and method that has an internal biomass retention mechanism (an internal settler for the suspended-growth process, and fixed or moving media for attached-growth process) to replace the conventional sludge return from the final clarifier for treating water and wastewater, and a zone that is operated under alternating aeration on/off conditions for pollutant removal. During the aeration-on period (aerobic condition) organic matter is oxidized and nitrification occurs, while during the aeration-off period (anoxic condition) denitrification occurs. When the mixing period is extended anaerobic condition could occur, promoting the growth of PAOs for phosphorus removal. The mixing may be accomplished by a air-driven surge lifting device.

In another embodiment of the disclosed invention it may be desirable to improve biological treatment by adding a mixing zone upstream of the alternating aeration on/off zone, operated under anaerobic or anoxic conditions, depending on the operational condition of the alternating aeration on/off zone. Tank content in the alternating aeration on/off zone is returned to the mixing zone through a pump device. In some instances it may include a means to transport biomass solids from the static zone to the mixing zone or both the mixing and alternating aeration on/off zones. If an appropriate amount of settles sludge slurry is returned from the static zone to the mixing zone, the tank content return from the alternating aeration on/off zone can be eliminated. The mixing within different zones may be accomplished by an air-driven surge lifting device. If desired, the static zone can be replaced with a detached clarifier in a separate structure.

In another embodiment of the disclosed invention it may be desirable to have an alternating aeration on/off zone and a solids-liquid separation tank in a separate structure, and settled sludge has to be returned from the solids-liquid separation tank to the aeration on/off zone (tank) using a pump device. However, the mixing of the aeration on/off zone (tank) is accomplished by a air lift device that creates periodic surge lifting motion to mix the tank content, reducing the energy and maintenance needs.

Yet another embodiment of the disclosed invention describes an apparatus to create large diameter gas bubbles within a pump housing (such as airlift pump) to provide higher lifting potential periodically. This particular embodiment includes a gas collection chamber and the means to transfer gas to the pump housing. The gas collection chamber coalesces small gas bubbles to a certain volume before periodically discharging them into the pump riser. As a result, large gas bubbles within the pump riser force the liquid within the pump riser to move upward via the buoyant force of the gas.

Still another embodiment of the disclosed invention describes a method and apparatus to anaerobically digest organic materials such as animal and human wastes, biosolids, wastewater, etc. and to produce biogas. This particular embodiment comprises a sealed tank and an automatic mixing device. In this case biogas bubbles produced in the lower portion of the tank are collected and coalesced by the mixing device. After reaching a certain volume the gas is released to a riser at once, creating a significant suction within the riser that transports solids and liquid from the bottom of the tank to the upper level of the tank and effectively mixing the tank. This mixing function also reduces possible sludge build up at the tank bottom and breaks up the floating sludge within the tank. The tank content is displaced through the outlet after addition of the new feed.

Further objects, embodiments, forms, benefits, aspects, features and advantages of the claimed technology may be obtained from the description, drawings, and claims provided herein.

BRIEF DESCRIPTION OF THE DRAWINGS

FIG. 14 is a cross sectional view of a liquid lift device according to a further embodiment of the disclosed invention.

FIG. 15 is a cross sectional view of a liquid lift device according to an alternate embodiment of the disclosed invention.

FIG. 16 is a cross sectional view of a liquid lift device according to another embodiment of the disclosed invention.

FIG. 19 is a cross sectional view of a liquid lift device according to an embodiment of the disclosed invention.

FIG. 20 is a cross sectional view of a liquid lift device according to another embodiment of the disclosed invention.

FIG. 21 is a cross sectional view of a liquid lift device according to a further embodiment of the disclosed invention.

DESCRIPTION

Figure 1:
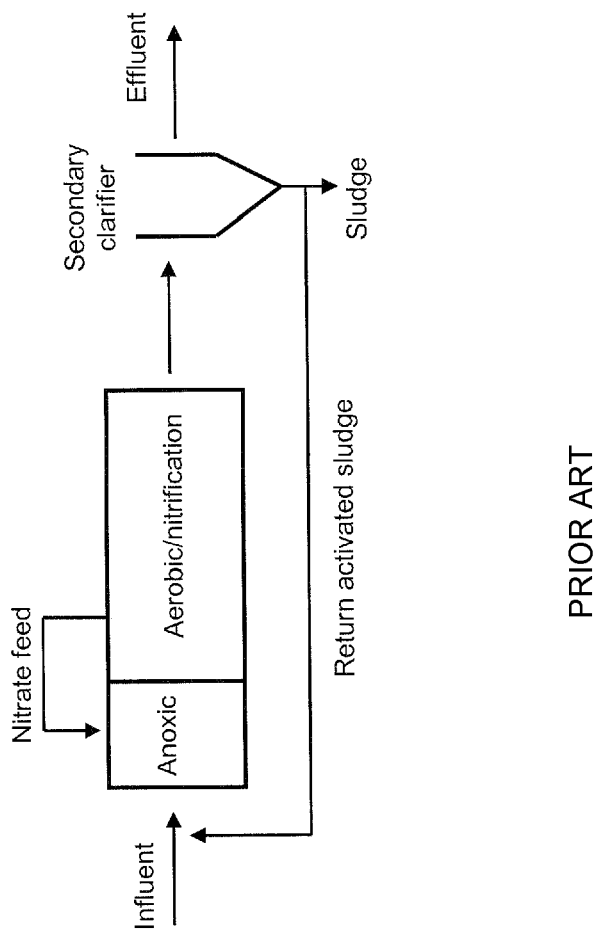
FIG. 1 is a flow diagram of a conventional pre-anoxic wastewater treatment process.
Figure 2:
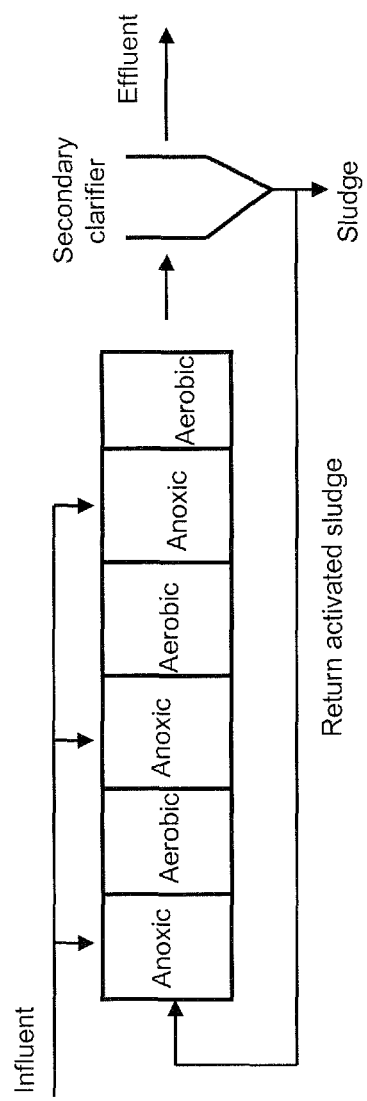
FIG. 2 is a flow diagram of a conventional step-feed nitrification and denitrification process.
Figure 3:
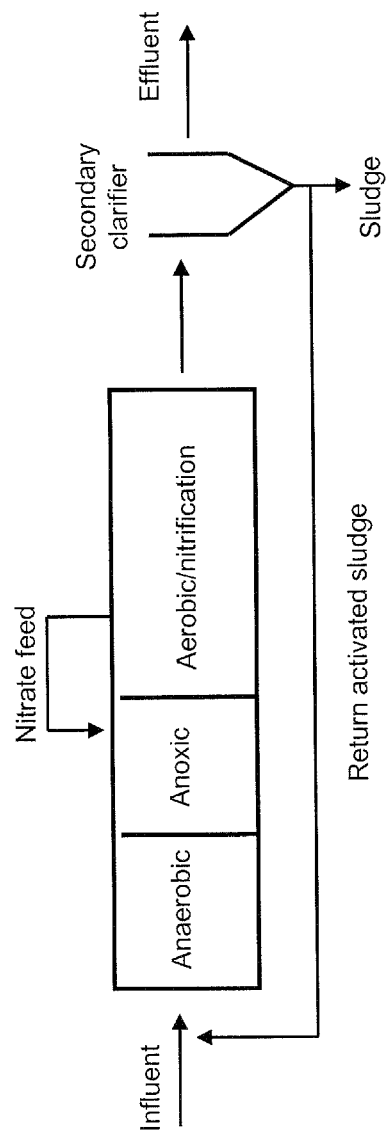
FIG. 3 is a conventional anaerobic/anoxic/oxic process ($A^2O$ process).

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

Appropriate mixing is extremely important for biological treatment of water, wastewater, and waste. In aerobic reactors, the air supplied for oxygen demand is normally sufficient for mixing needs so additional mixing devices are typically not needed. However, mechanical mixing devices are commonly used in anoxic and anaerobic processes due to the negative effects of dissolved oxygen to these processes. Conventional mixing methods, including mechanical mixing devices or air mixing devices, are continuously operated. In order to completely mix the reactor, these types of mixers consume significant amount of energy. In addition, mechanical mixing devices need regular maintenance, and continuous-flow air mixing devices provide only mild local mixing.

Figure 5:
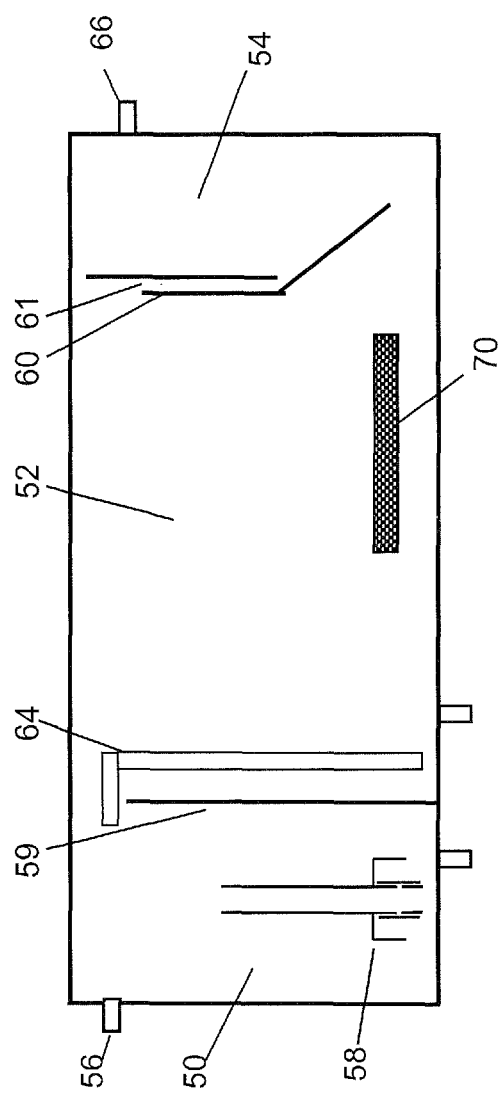
FIG. 5 is a cross sectional view of a bioreactor according to one embodiment of the disclosed invention.

FIG. 5 illustrates a cross-sectional side view of a preferred embodiment of the present invention. The bioreactor of this invention is separated into a mixing zone that is under an anoxic or an anaerobic condition (50), an aerobic zone (52), and a static zone (54). These zones may be separated by baffles (59, 60). Influent flows into the reactor through the inlet (56) and into the mixing zone (50) where it mixes with established biomass returned from the aerobic zone (52) through a mixed liquor return device (64), shown as an air lifting device but could be other return devices, to perform denitrification if the mixing zone is under an anoxic condition. If the mixing zone (50) is under an anaerobic condition, phosphorus accumulating organisms (PAOs) can be cultured to uptake phosphorus. A mixing device (58) driven by air that could provide periodic surge lifting action may be used to increase biological kinetics and prevent settling in the mixing zone, to reduce the operation cost.

The mixed liquor leaves the mixing zone (50) and enters the aerobic zone (52) where organic matter is degraded and nitrification is performed if an appropriate sludge age is maintained. An aeration device (70) is used to impart oxygen to the aerobic zone (52) for aerobic reactions. The mixed liquor then flows to the static zone (54) through a conduit (61) formed by a baffle group (60). The static zone (54) is used to settle biomass, and the settled biomass is automatically returned to the aerobic zone (52) through the open bottom of the static zone (54) as a result of the air lifting force in the aerobic zone, which creates a continuous return flow in a conduit (61) connecting the upper portion of the aerobic zone (52) to the lower portion of the static zone (54), to carry the settled biomass back to the aerobic zone (52). This channel (61) can also be a three-way pipe, an elbow, or any other forms of conduits.

While FIG. 5 demonstrates an embodiment that employs a static zone (54) that has an open-bottom, the bottom of the static zone can also be closed. If the bottom of the static zone (54) is closed, a separate sludge return device to return the settled sludge from the static zone (54) to the aerobic zone (52) or the mixing zone (50) is needed. This sludge return device could be mechanical pump or air lifting device. An air lifting device is preferred due to the negligible head difference between the aerobic zone (52) and the static zone (54) and the low maintenance nature of the air lifting device. In particular, if the air lifting device could result in a surge or pulsation action such as those described later herein, it could improve the sludge thickening within the static zone (54). If the sludge return device returns an appropriate amount of settled sludge slurry from the static zone (54) to the mixing zone (50), the mixed liquor return device (64) could be eliminated. Ammonia and/or nitrate within the alternating aerobic zone (52) can be used as an indicator to control the operation of the aeration device (70).

Figure 4:
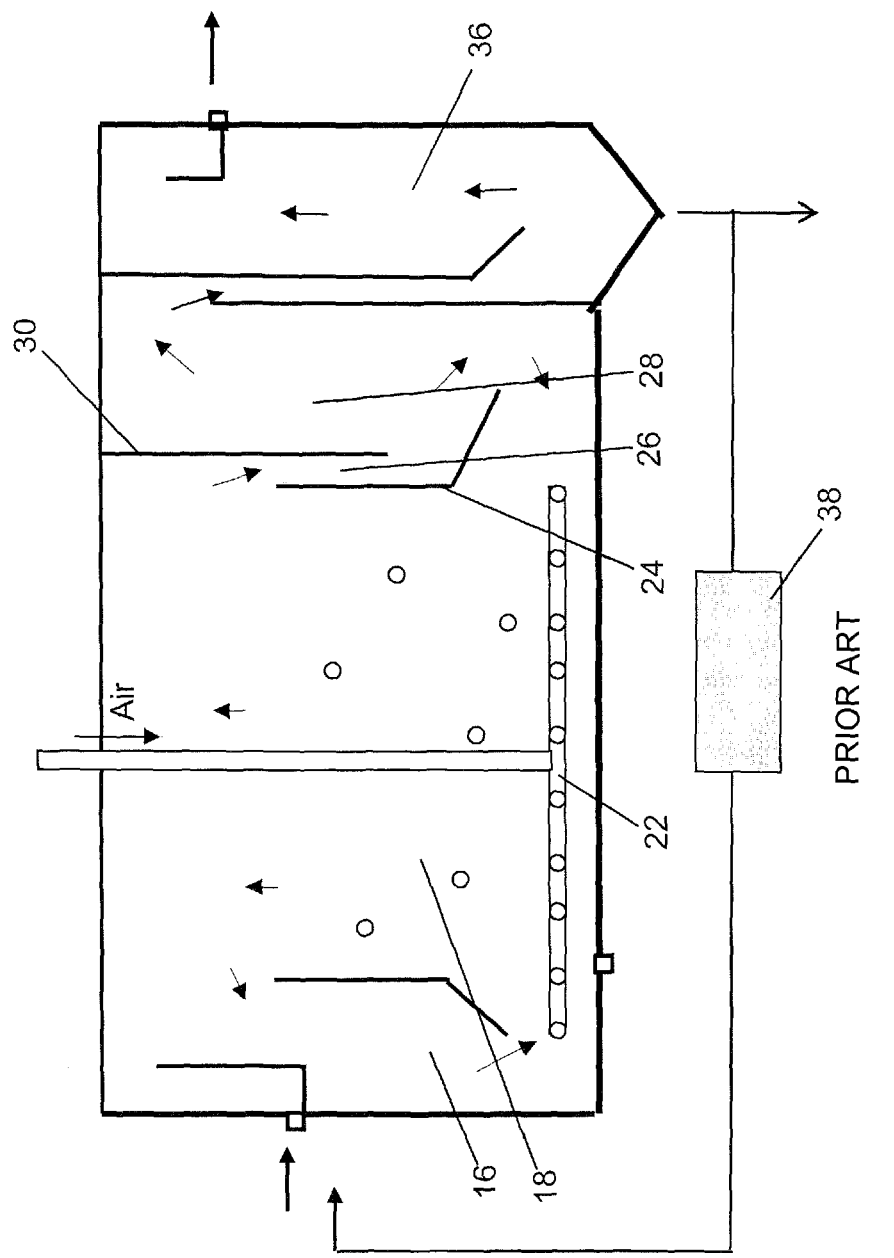
FIG. 4 is a cross sectional view of a bioreactor from U.S. Pat. No. 6,787,035.

Compared to conventional processes that have a separate clarifier design, the present invention has the settling zone (e.g. static zone) built in the same tank with the aerobic zone, which results in negligible head loss when mixed liquor flows from the aerobic zone to the settling zone. If the static zone (54) has a closed bottom, the sludge return from the static zone to the aerobic zone (52) or the mixing zone (50) will use much less energy compared to the conventional processes that have a separate clarifier. If the static zone (54) has an open bottom, the separate sludge return device is eliminated, and settled sludge in the static zone (54) is automatically returned to the aerobic zone (52), significantly simplifying the operation. Compared to a prior art shown in FIG. 4, the present invention uses a mixed liquor return device (64) to better control the return flow, and the mixing zone (50) is also better isolated from the aerobic zone (52) through baffle (59) which extends to the bottom of the tank. Therefore, the DO carried to the mixing zone by the return stream can be limited, improving the mixing zone performance for denitrification or PAO culturing. In addition, the sludge return device (38) used in the prior art to return settled sludge from a separate clarifier to the reactor is eliminated. Compared to other processes, the present invention uses an energy-efficient surge mixing device, driven by air and without any moving part, to create periodic surge lifting action to mix the content within the mixing zone, therefore reduces the energy use and maintenance needs.

An additional mixing zone can be placed ahead of the above mixing zone-aerobic zone design, and sludge from the static zone can be returned to either mixing zones. If it is returned to the second mixing zone, the mixed liquor in the second mixing zone may be returned to the first mixing zone. This arrangement allows the three zones to be under anaerobic-anoxic-oxic conditions in series, to achieve both nitrogen removal and phosphorus removal. All mixings are air-driven and can perform surge lifting action. All return devices may also be air driven to simplify operation. Alternatively, some or all of the mixing and/or transport devices may be powered by electricity, hydraulics, or other suitable means.

Figure 6:
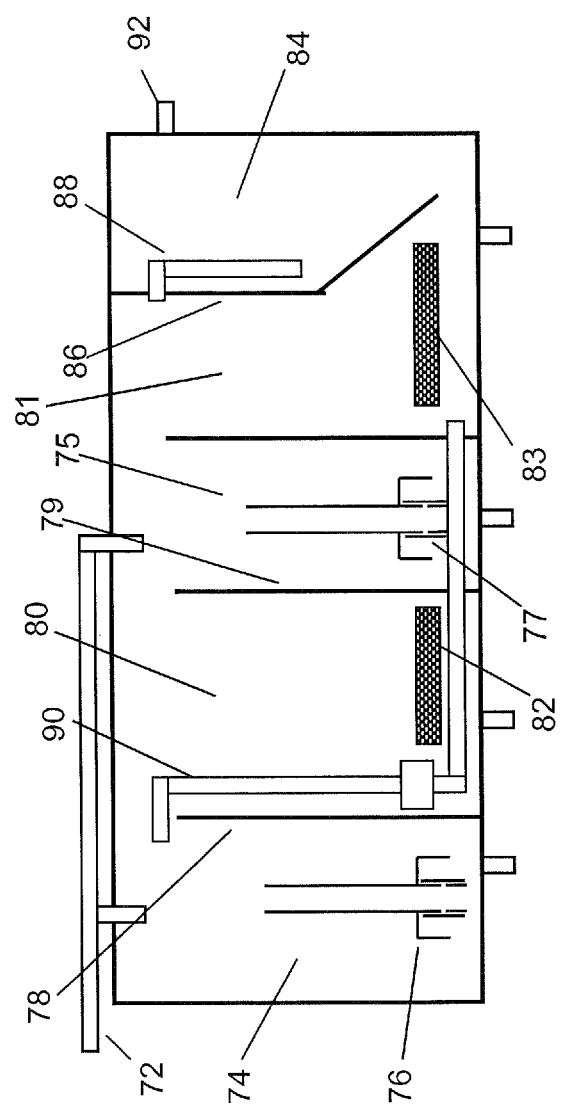
FIG. 6 is a cross sectional view of a bioreactor according to still another embodiment of the disclosed invention.

FIG. 6 illustrates a cross-sectional side view of a another embodiment in accordance with the disclosed technology. Although two pairs of anoxic/aerobic zones are shown in this particular embodiment, more than two pairs are possible and should be considered intuitive to forms of this embodiment. Influent enters the reactor through an inlet (72) and enters at least one of the mixing zones (74, 75). Mixing devices (76, 77) that are able to provide surge lifting motion are used to increase biological kinetics in mixing zones and prevent settling, and are shown in this particular example as an airlift device that could generate periodic surge lifting action as described later herein. In other embodiments, other types of mixing devices may also be used.

Mixed liquor content from the mixing zone (74) flows through the separation wall (78) and proceeds into other zones, at least one of which will be an aerobic zone (80, 81) where an aeration device (82, 83) is used to provide oxygen for organic matter degradation and nitrification. Finally, it will reach a static zone (84) that is defined by a baffle (86) that may or may not extend to the bottom of the reactor, and a conduit (88), shown as an elbow, that redirects the inflow toward the bottom of the static zone (84). This conduit can also be a channel formed by two baffles, three-way pipes, or any other forms of conduits.

Sludge solids settle to the bottom of the static zone (84) where they may be automatically returned to the preceding aerobic zone (81) if the settling baffle (86) doesn't extend to the bottom of the reactor, and the mixed liquor in the aerobic zone (81) is returned to the first mixing zone (74) through a pumping device (90). If the baffle (86) extends to the bottom of the reactor, the solids at the bottom of the static zone (84) are conveyed to the first mixing zone (74) via a pumping device similar to (90), with the suction end extends to the bottom of the static zone (84). Although not illustrated, additional means to return solids should be considered intuitive to the design of this embodiment. This embodiment is displayed with a baffle (86) that doesn't extend to the bottom of the reactor, but alternative embodiments may include a baffle that extends to the bottom of the reactor. Supernatant in the static zone (84) leaves the reactor as effluent through an outlet (92).

Figure 7:
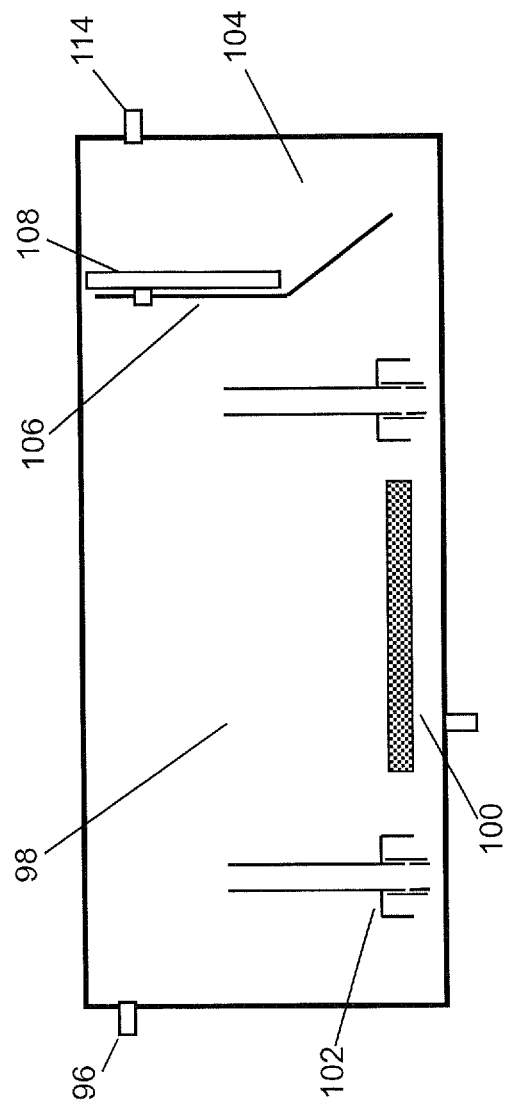
FIG. 7 is a cross sectional view of a bioreactor according to yet another embodiment of the disclosed invention.

FIG. 7 illustrates a cross-sectional side view of another embodiment in accordance with the disclosed technology. Influent enters the bioreactor through an inlet (96) and enters the alternating aeration on/off zone (98). The alternating aeration on/off zone (98) comprises an aeration device (100) and one or more mixing devices (102), which is illustrated in FIG. 7 as an embodiment of the airlift device described later herein and can create periodic surge lifting motion to mix the tank with minimal energy and maintenance needs. The aeration is operated in an cycling on and off pattern, and the mixing device (102) is operated at least during the aeration-off period. Therefore, the reactor is operated in alternating aeration on/off fashion. Still other embodiments may include multiple aeration and/or mixing devices as desired. By alternating between aerobic and anoxic (aeration is off but mixing is on) conditions the reactor can accomplish nitrification and denitrification in the same tank but at different times. If the inflow enters the tank only during the aeration-off period or part time of the aeration-off period, the organic matter from the raw influent can be directly used as a carbon source by the biomass for denitrification.

The mixed liquor leaves the alternating aeration on/off zone (98) and enters the static zone (104), which is defined by a baffle (106) that may or may not extend to the bottom of the reactor, and a conduit (108) that redirects inflow toward the bottom of the static zone (104), shown as a 3-way pipe. This conduit can also be a channel formed by two baffles, an elbow, or any other forms of conduits.

Sludge solids settle to the bottom of the static zone (104) where they may be automatically returned to the alternating on/off zone (98) if the baffle (106) doesn't extend to the bottom of the reactor shown in FIG. 7. In this event forced sludge return may not be necessary. However, if the baffle (106) extends to the bottom of the reactor, the solids at the bottom of the static zone (104) need to be conveyed back to the alternating aeration on/off zone (98) via a pump device. The embodiment displayed in FIG. 7 contains a baffle (106) that doesn't extend to the bottom of the reactor, but other embodiments may include a baffle which extends to the bottom of the reactor. Supernatant in the static zone (104) leaves the reactor as effluent through an outlet (114).

Compared to conventional alternating aerobic-anoxic (AAA) process, the present invention has one-tank design which reduces the head loss when mixed liquor flows from the alternating aeration on/off zone to a secondary clarifier in a separate structure, therefore the sludge return from the static zone of the present invention is much easier. Moreover, the embodiment in FIG. 7 has an open bottom design of the static zone (104), therefore sludge return is accomplished automatically, without using any sludge return device, significantly simplifying the operation. In addition, the mixing may be operated by surge lifting device, driven by air, to reduce energy use and maintenance cost. Compared to a prior art shown in FIG. 4 which operates in continuous aerobic condition in the aeration zone, the aeration device in the present invention operates in a cycling on and off pattern to achieve nitrification and denitrification in the same volume but at different times. Therefore the present invention can achieve comprehensive total nitrogen removal. If the aeration-off period is extended, anaerobic condition can occur, which promotes the growth of PAOs for phosphorus removal. As a results, both nitrogen and phosphorus can be removed with the reactor. A polishing clarifier can be used to remove solids carried out by the effluent from the reactor. In addition, an aeration tank can be installed between the reactor of the present invention and the polishing clarifier, to further remove residual ammonia in the reactor effluent, and to promote biological uptake of phosphorus by PAOs. Ammonia and/or nitrate within the alternating on/off zone can also be used as an indicator to control the operation of the aeration device (100).

Figure 8:
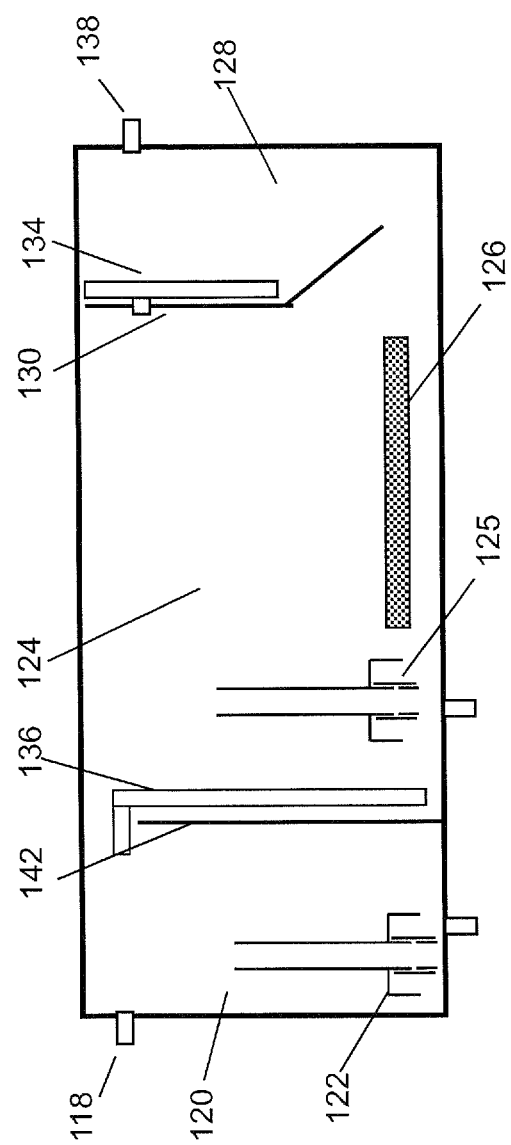
FIG. 8 is a cross sectional view of a bioreactor according to one embodiment of the disclosed invention.

FIG. 8 illustrates a cross-sectional side view of an alternative embodiment of the disclosed technology. Influent enters the reactor via inlet (118) and flows into a mixing zone (120), and mixed with the return mixed liquor from the alternating aeration on/off zone (124) by a mixing device (122). The mixed liquor return is accomplished by a mixed liquor return device (136). The purpose of this front mixing zone is to enhance biological phosphorous removal and denitrification, and is operated under anaerobic and anoxic conditions, depending on the operation cycle of the treatment process. The tank content leaves the mixing zone (120) and enters the alternating aeration on/off zone (124), which is separated by a baffle (142). The mixing zone and alternating aeration on/off zone (124) could also be located in separate tanks as long as they have the similar functions as described above.

The aeration device (126) in the alternating aeration on/off zone (124) is operated in a cycling on and off pattern for organic matter removal and nitrification when the aeration device is on, and for denitrification when the aeration device is off. The mixing device (125) in the alternating aeration on/off zone (124) is operated at least during the aeration-off period. When the alternating aeration on/off zone is under aerobic condition (the aeration device is on), the mixing zone (120) is more likely under anoxic condition. When the alternating aeration on/off zone is operated in the anoxic condition (without aeration but with mixing), the mixing zone (120) may be under anaerobic condition because there is no DO in the return mixed liquor. Therefore, through this mixing zone (120) and alternating aeration on/off zone (124), anaerobic-anoxic-aerobic conditions can be maintained within the same reactor, and comprehensive nitrogen and phosphorus removal can be accomplished without using an additional zone. The mixed liquor leaves the alternating aeration on/off zone (124) and enters the static zone (128), which is defined by a baffle (130) that may or may not extend to the bottom of the reactor, and a conduit (134) that redirects the mixed liquor toward the bottom of the static zone (128) shown in FIG. 8 is a 3-way pipe. This conduit can also be a channel formed by two baffles, an elbow, or any other forms of conduits.

Sludge solids settle to the bottom of the static zone (128) where they may be automatically returned to the alternating aeration on/off zone (124) if the settling baffle (130) doesn't extend to the bottom of the reactor. If the baffle (130) extends to the bottom of the reactor, the solids at the bottom of the static zone (128) need to be conveyed back to the alternating aeration on/off zone (124), or to the mixing zone (120) via a pump device. If the sludge is conveyed back to the mixing zone (120) directly from the static zone (128), the mixed liquor return device (136) may be eliminated. Supernatant in the static zone (128) leaves the reactor as effluent through the outlet (138).

A polishing clarifier can be used to treat the effluent from the static zone (128), to remove solids carried out of the bioreactor. Moreover, a aeration zone or tank can be installed between the bioreactor and the polishing clarifier, to recharge oxygen to the effluent from the bioreactor of the present invention, to facilitate biological phosphorus uptake by the sludge and reduce the residual ammonia and organic nitrogen concentration in the bioreactor effluent, and prevent sludge floating in the polishing clarifier caused by denitrification.

Compared to the embodiment shown in FIG. 5, FIG. 8 has an cycling aeration on and off operation pattern in the alternating aeration on/off zone, therefore the nitrate/nitrite in the alternating aeration on/off zone can be denitrified within the same zone during the aeration-off period. In addition, the preceding mixing zone (120) can be more easily maintained in an anaerobic condition as a result of the more complete denitrification of the mixed liquor within the alternating aeration on/off zone, therefore it can encourage the growth of PAOs for better phosphorus removal. Compared to conventional $A^2O$ process or UCT process that have three zones or tanks in the bioreactor, the present invention only have two zones or tanks and less return streams. Therefore, it is easier to construct and operate. In addition, during the aeration-off period the entire alternating aeration on/off zone is under anoxic condition, therefore the nitrate/nitrite species can be completely denitrified, therefore the final effluent should have a lower total nitrogen concentration than that from $A^2O$ and UCT processes. Moreover, the application of the static zone within the same tank with the alternating aeration on/off zone makes the process even simpler because the sludge return device takes much less energy to operate if the static zone has a closed bottom. If the static zone has an open bottom, the sludge return device can be eliminated, making the process much more simpler. Ammonia and/or nitrate within the alternating aeration on/off zone (124) can also be used as an indicator to control the operation of the aeration device (126).

Figure 9:
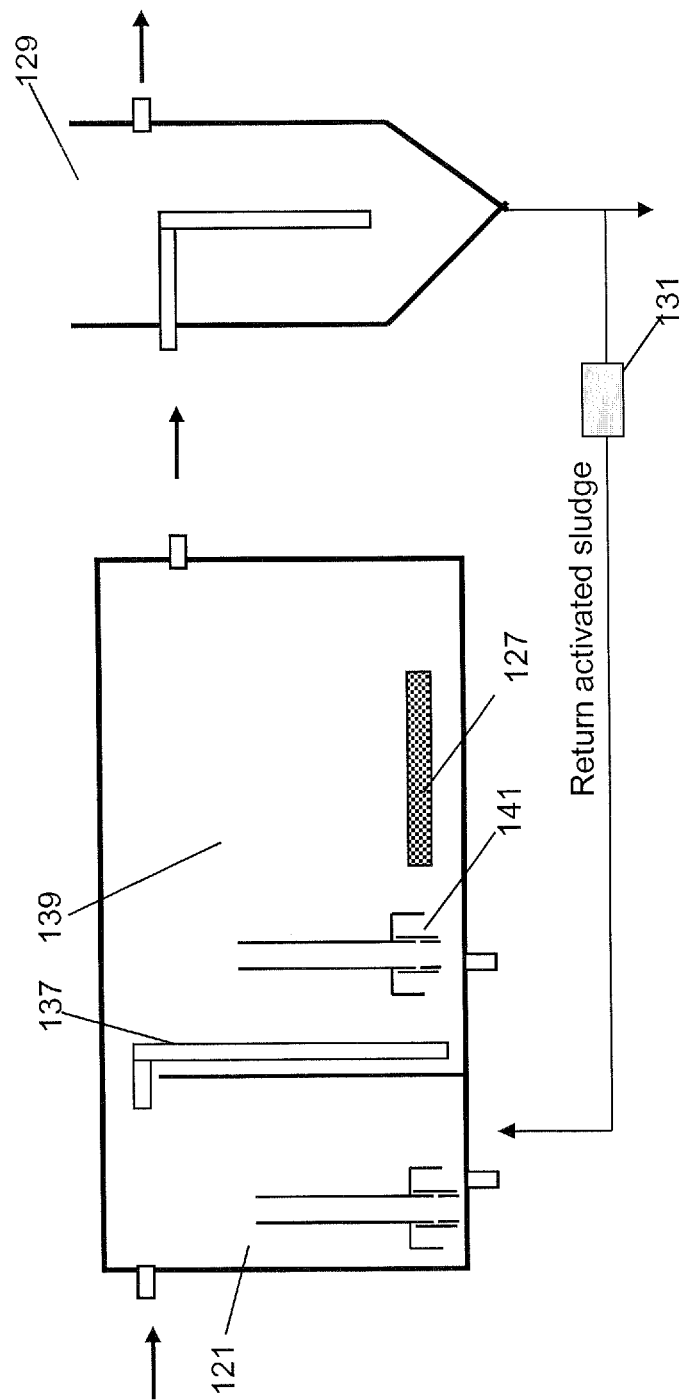
FIG. 9 is a cross sectional view of a biological treatment method according to another embodiment of the disclosed invention.

FIG. 9 illustrates a cross-sectional side view of an alternative embodiment of the disclosed technology, which is operated similarly as the FIG. 8 embodiment, e.g. in anaerobic-anoxic conditions for the mixing zone and anoxic-oxic conditions for the alternating aeration on/off zone. However, compared to the FIG. 8 embodiment, FIG. 9 embodiment has a detached clarifier (129) in a separate structure. Therefore, it has to use a sludge return device (131) to forcibly return the activated from the clarifier (129) back to one or both of the preceding zones or tanks. The mixed liquor return device (137) may be eliminated if an appropriate return from the clarifier (129) is achieved. This process has significant advantages over prior arts that also employ a detached clarifier. For example, compared to the conventional pre-anoxic process which maintains the aerobic condition in the aeration zone (or tank) following the mixing zone (or tank) all the time, the aeration device (127) within the alternating aeration on/off zone (139) is operated in a cycling on and off pattern, and the mixing device (141) is on at least during the aeration-off period. As a result, the mixing zone (121) is operated in anaerobic and anoxic condition, depending on the operational condition of the alternating aeration on/off zone (139). This operation not only improves denitrification but also encourages the growth of PAOs for phosphorus removal. As a result, compared to the conventional pre-anoxic process, FIG. 9 embodiment has better nitrogen and phosphorus removal performance. Compared to the conventional AAA process, an additional mixing zone (121) is dedicated for mixing therefore can maintain a better anoxic condition because it has no aeration all the time. This mixing zone can also achieve anaerobic condition to promote phosphorus removal. As a result, compared to the conventional AAA process, the FIG. 9 embodiment has a higher denitrification rate and also adds phosphorus removal capacity. Compared to $A^2O$ process or UCT process, FIG. 9 embodiment only has two zones (or tanks) within the bioreactor, therefore simplifies construction and operation. Moreover, it can achieve more comprehensive denitrification then $A^2O$ process or UCT process because the alternating aeration on/off zone can also perform denitrification when the aeration device is not in operation. Between the bioreactor and the clarifier (129) an aeration tank can be added to add oxygen to the bioreactor effluent, to facilitate phosphorus uptake by PAOs, to further oxidize ammonia and organic nitrogen, and to prevent sludge floating within the clarifier caused by denitrification.

Figure 10:
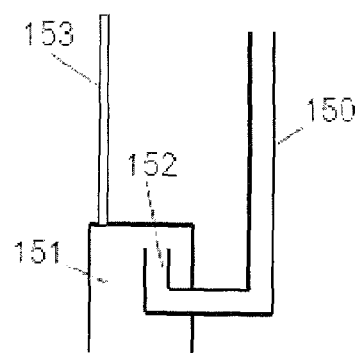
FIG. 10 is a cross sectional view of a liquid lift device according to an embodiment of the disclosed invention.

FIG. 10 illustrates a cross-sectional side view of one embodiment of an air- or gas-lift type device to lift liquid and liquid mixtures (sludge, mud, oil, or particles in liquid). This embodiment collects and stores gas (could be air, biogas, or other type of gases) in the gas collection chamber (151) to a certain volume, then hydraulically release it at once through the conduit (152) to the riser tube (150), to form a large gas plug inside the riser tube (150) and create a surge lifting motion, pulling liquid content to the top of the riser tube (150). If the gas is continuously supplied, this surge lifting motion repeats periodically. Therefore, this device is termed surge lifting device herein to differentiate it with conventional continuous flow airlift devices. Gas enters the gas collection chamber (151) through either a gas supply line (153) as shown or by rising from a source below the device (not shown). In some applications the housing of the gas collection chamber (151) can be further extended to below the bottom of the riser tube (150).

During operation, the gas is initially collected by and stored in the gas collection chamber (151). The volume of the gas expands downward until the gas-liquid interface reaches the lower end of the conduit (152), shown as a U-shaped tube. When gas is further collected and the gas volume is further expended, it will overcome the surface tension of the liquid and breaches into the riser tube (150), causing an initial lift within the riser tube (150). This initial lift further pulls the entire volume of the gas within the gas collection chamber (151) into the riser tube (150) at once, creating a gas plug within the riser tube therefore a significant lifting action, e.g. surge lifting action. This surge lifting action pulls the tank content and releases it to anywhere above the top of the riser tube (150). Therefore, this surge lifting device can be used to transport liquid, liquid mixtures, sludge, particles in liquid, etc. from one location to another, and can also be used to perform tank mixing, or to simply generate large gas bubbles if needed.

Figure 11:
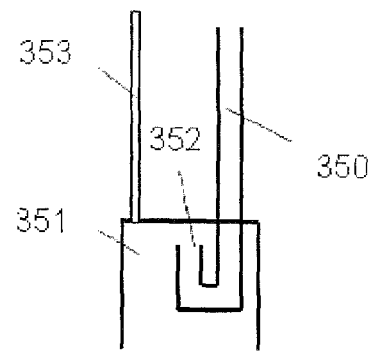
FIG. 11 is a cross sectional view of a liquid lift device according to another embodiment of the disclosed invention.
Figure 12:
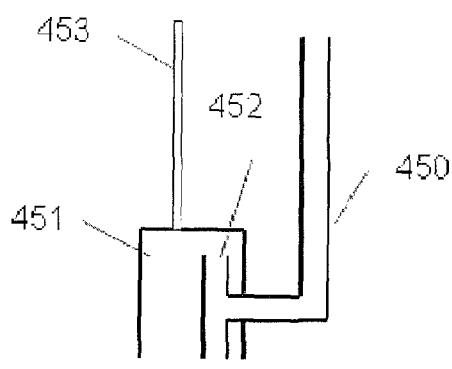
FIG. 12 is a cross sectional view of a liquid lift device according to yet another embodiment of the disclosed invention.
Figure 13:
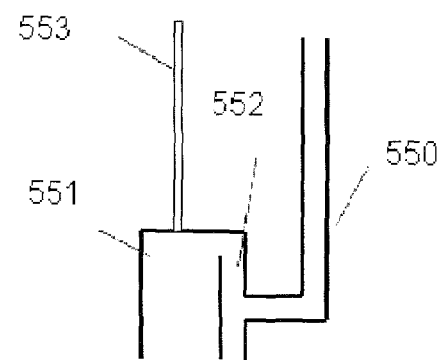
FIG. 13 is a cross sectional view of a liquid lift device according to still another embodiment of the disclosed invention.

FIG. 11 illustrates a cross-sectional side view of another embodiment of the surge lifting device, where the U-shaped conduit (352) and the bottom end of the riser (350) is inside the gas collection chamber (351). Gas enters the gas collection chamber (351) through either an optional gas supply line (353) as shown or by rising from a source below the device (not shown). FIG. 12 illustrates a cross-sectional side view of another embodiment of the surge lifting device, where the conduit (452) is a three-way pipe and the bottom end of the riser (450) is inside the gas collection chamber (451) to which a gas supply line (453) may be attached. Using the 3-way pipe can reduce the chance of clogging, and it is also easy to clean if clogged. FIG. 13 illustrates a cross-sectional side view of another embodiment of the surge lifting device, where the conduit (552) is formed by a baffle, and the bottom end of the riser (550) is inside the gas collection chamber (551) to which a gas supply line (553) may be attached. FIG. 14 illustrates a cross-sectional side view of another embodiment of the surge lifting device, where the gas collection chamber (651) is open to one side, where the U-shaped conduit (652) and the bottom end of the riser (650) is inside the gas collection chamber (651), and where gas enters the gas collection chamber (651) through either a gas supply line (653) as shown or by rising from a source below the device (not shown). FIG. 15 illustrates a cross-sectional side view of another embodiment of the surge lifting device, where the gas collection chamber (751) is open to one side, and the conduit is formed by a larger closed-end tube (752) into which the riser (750) extends. Optionally, this embodiment may also include a gas supply line (753). All embodiments shown in FIGS. 10-15 can also collect gas from anywhere below the gas collection chamber rather than through a gas supply line, if desired.

Figure 17:
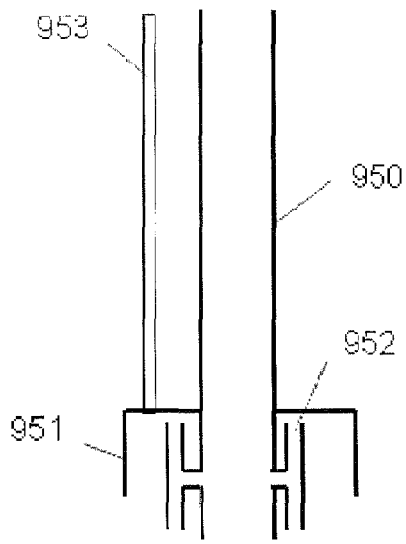
FIG. 17 is a cross sectional view of a liquid lift device according to another embodiment of the disclosed invention.
Figure 18:
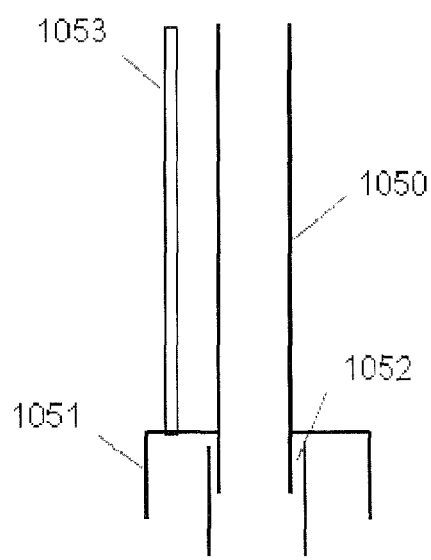
FIG. 18 is a cross sectional view of a liquid lift device according to another embodiment of the disclosed invention.

FIGS. 16-18 illustrate a cross-sectional side view of several other embodiments of the surge lifting device. All these embodiments feature an open bottom riser tube (850, 950, 1050). The conduit (852) in the FIG. 16 embodiment is formed by a baffle and an orifice located above the bottom edge of the gas collection chamber (851). The housing of the gas collection chamber (851) or the lower end of the riser tube (850) can be further extended to other directions to reach different locations. The conduit (952) in the FIG. 17 embodiment is formed by a 3-way pipe, and the housing of the gas collection chamber (951) or the lower end of the riser tube (950) can be further extended to reach different locations. The conduit (1052) in the FIG. 18 embodiment is formed by another pipe that has a larger diameter than the riser tube (1050) encompassing the riser tube. The housing of the gas collection chamber (1051) or the larger diameter pipe can be further extended to other directions to reach different locations. The open bottom riser tube (1050) makes the liquid transfer more direct, without going over the top of the conduit as shown in some other embodiments. In addition, the conduits (852, 952, 1052) used in these embodiments have both top and bottom open, which significantly reduced, if not eliminated, the potential clogging issue. In case of clogging, it could be much easier to clean when compared to other devices that use an elbow as the conduit. All embodiments shown in FIGS. 16-18 can also collect gas from anywhere below the gas collection chamber rather than through the gas supply line (853, 953, 1053). The top of the gas collection chamber (851, 951, 1051) can also be sloped to reduce sludge deposition.

FIGS. 19-21 illustrate cross-sectional side views of several other embodiments of a surge lifting device, with extended riser tube (1154) or gas collection chamber housing (1255, 1355). All of these embodiments include a riser tube (1150, 1250, 1350), a gas collection chamber (1151, 1251, 1351), conduits (1152, 1252, 1352), and optionally include gas supply lines (1153, 1253, 1353) The embodiment shown in FIG. 19 can also collect gas from anywhere below the gas collection chamber (1151) rather than through only the gas supply line (1153), and the top of the gas collection chamber (1151) can be sloped reduce sludge deposition.

Figure 22:
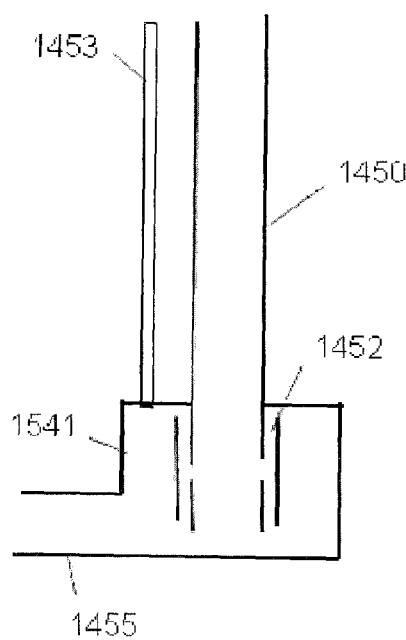
FIG. 22 is a cross sectional view of a liquid lift device according to one embodiment of the disclosed invention.
Figure 23:
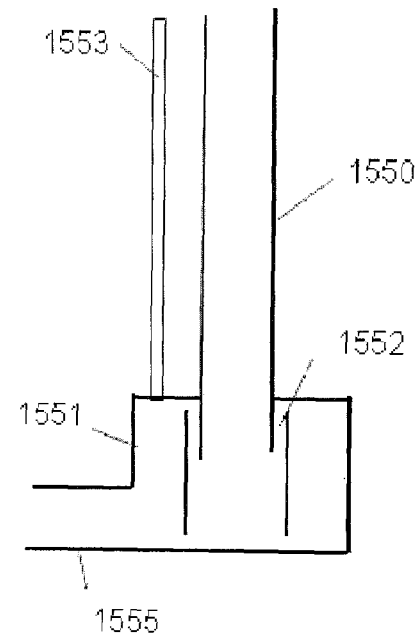
FIG. 23 is a cross sectional view of a liquid lift device according to another embodiment of the disclosed invention.
Figure 24:
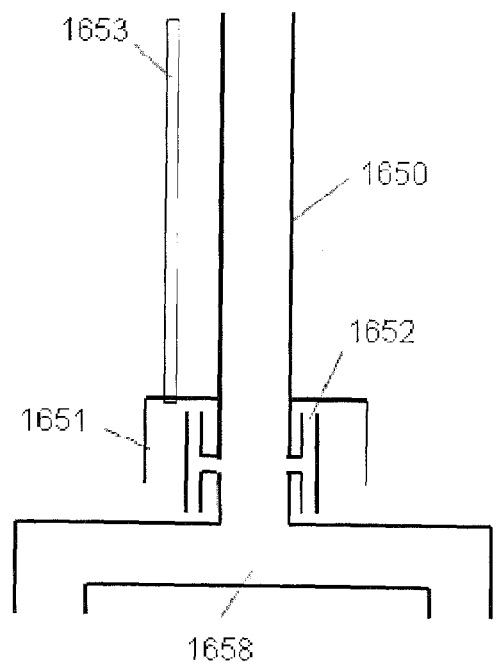
FIG. 24 is a cross sectional view of a liquid lift device according to still another embodiment of the disclosed invention.

FIGS. 22-24 illustrate cross-sectional side views of yet several other embodiments of a surge lifting device, with extended gas collection chamber housings (1455, 1555) on side of the gas collection chamber (1451, 1551) or a three-way pipe fitting (1658) at the bottom of the riser tube (1650) and disposed within the gas collection chamber (1651). These embodiments can be used to transport or lift liquid, create a pulsation motion (caused by the periodic surge), create large gas bubbles, mix tank content, or for any other applications involve gas and liquid. All of these embodiments include a riser tube (1450, 1550, 1650), a gas collection chamber (1451, 1551, 1651), conduits (1452, 1552, 1652), and may optionally include a gas supply line (1453, 1553, 1653).

Figure 25:
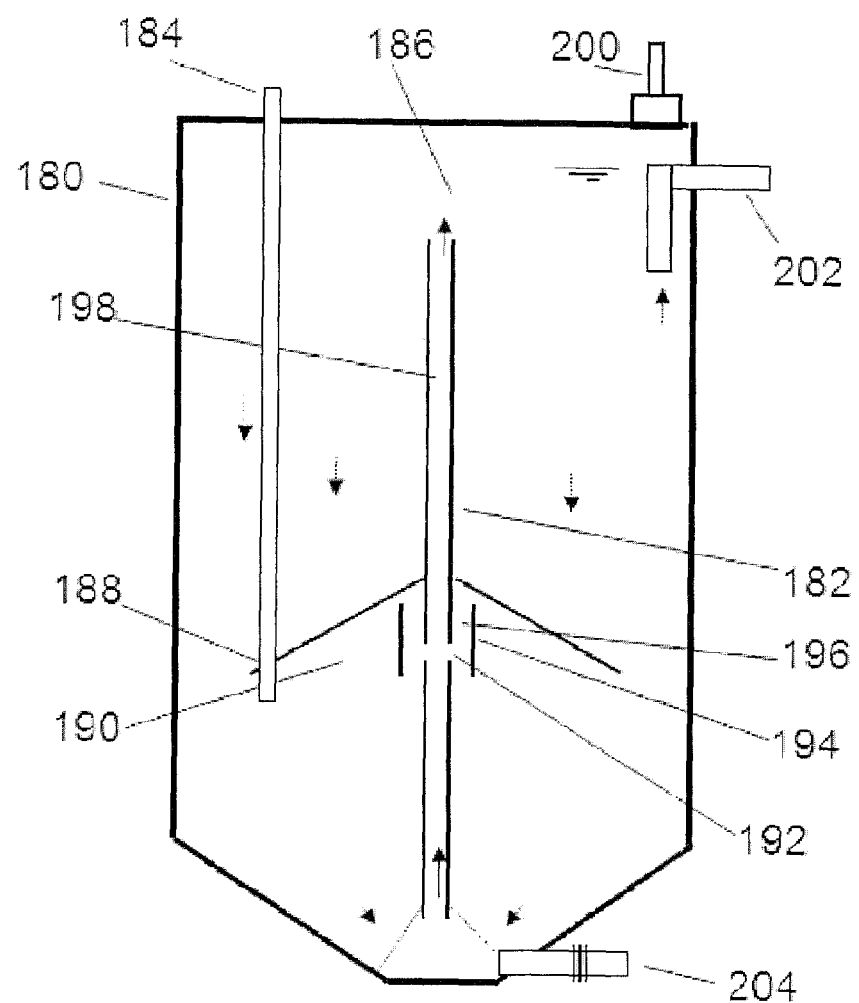
FIG. 25 is a cross sectional view of a reactor and lift device according to one embodiment of the disclosed invention.

FIG. 25 illustrates a cross-sectional side view of an embodiment of the disclosed technology wherein a vessel (180) includes a surge lifting device (182) similar to those described with respect to previous embodiments. Feed is introduced into the reactor vessel (180) via inlet (184). There it mixes with, and is consumed by, anaerobic bacteria which produce useful gas, such as methane, as a metabolic byproduct. As gas bubbles generated under the gas collection collar (188), they float upward and are captured by the gas collection collar (188) and begin to coalesce in the gas collection chamber (190). The gas expands in volume until it reaches the top of the orifice (192) that is covered by the orifice baffle (194). At this point the gas flows through the gas conduit (196) and the orifice (194) and enters the upper riser (198), creating an initial lifting force within the riser (198). This initial lifting force pulls the entire volume of gas collected in the gas collection chamber (190) and forms a gas plug within the riser (198). This gas plug pulls tank content from the bottom of the reactor vessel and deposits them at the top, effectively mixing the reactor. Accumulated gas leaves the reactor via gas outlet (200). Effluent from the reactor leaves through a liquid outlet (202), and the reactor can be drained through the drain (204) if needed. Alternative embodiments may include more or fewer inlets, gas outlets, liquid outlets, and/or drains as desired. Other baffles can be installed to the insider wall of the vessel below the gas collection collar (188) to direct all biogas generated below the surge lifting device to the gas collection chamber, to increase the mixing frequency. In addition, while a baffle (194) is used to create the conduit connecting the gas collection chamber (190) with the riser (198) in FIG. 25, a three-way pipe or other types of conduits can also be used to create the same effect.

Figure 26:
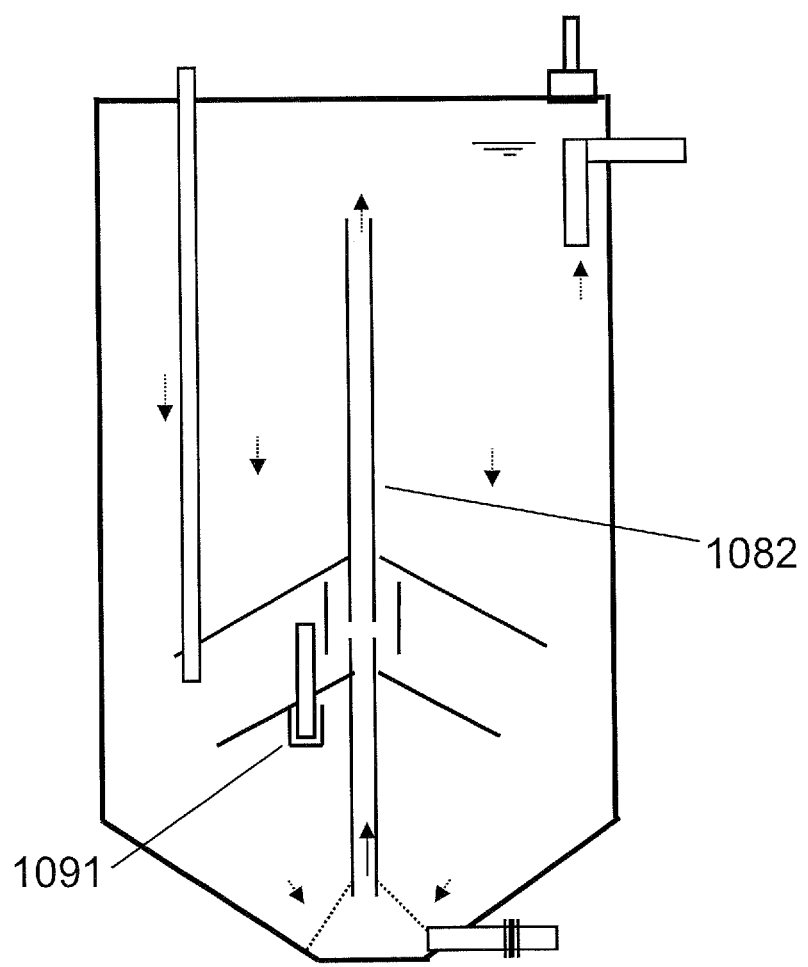
FIG. 26 is a cross sectional view of a reactor and lift device according to another embodiment of the disclosed invention.

FIG. 26 illustrates a cross-sectional side view of another embodiment in accordance with the disclosed technology. This particular embodiment includes an performance-improving components that may be added individually or collectively to the embodiment seen in FIG. 25. This is a means (1091) to create large gas bubbles periodically below the gas collection collar of the surge lifting device (1082), to induce the surge lifting action of the surge lifting device (1082). The means (1091) is similar to embodiments in FIGS. 10-15, which collects gas below it and create large gas bubbles periodically. These periodic large bubbles will force the surge action of the surge lifting device (1082) to start during the operation.

Figure 27:
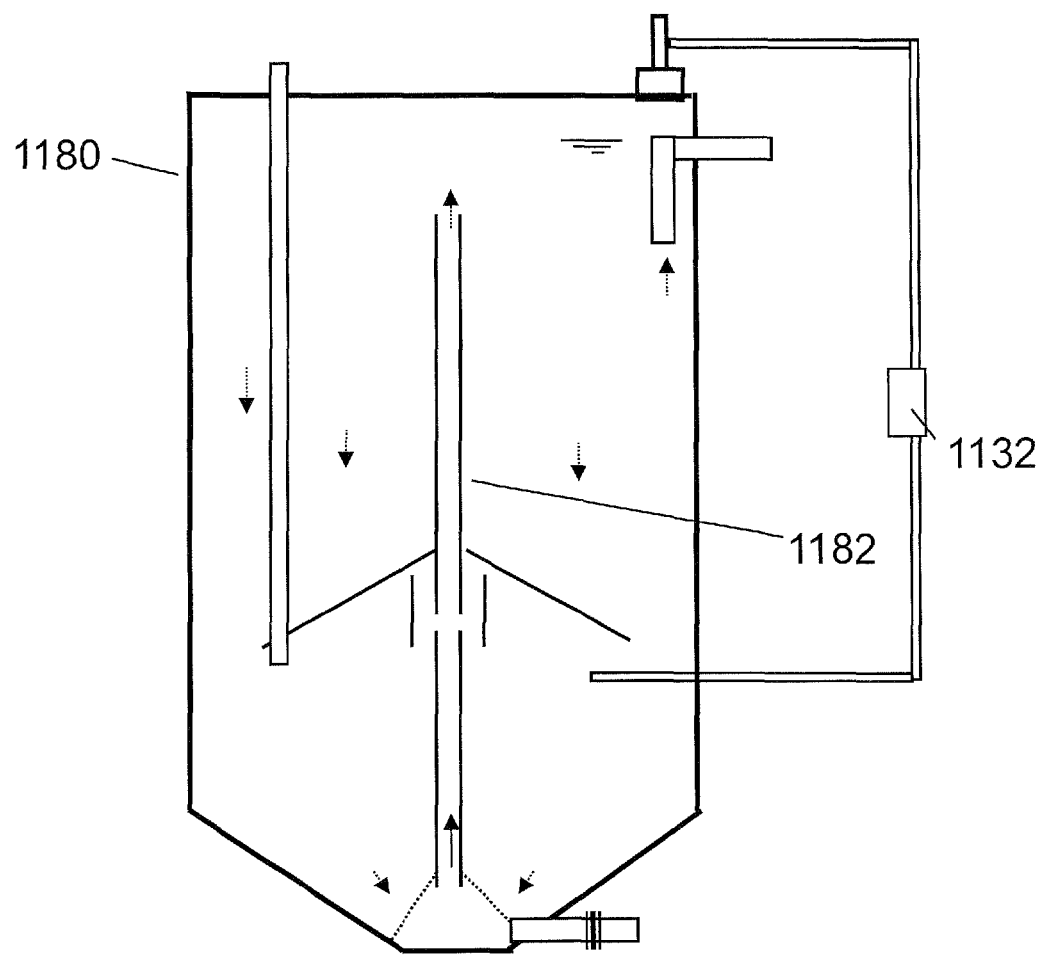
FIG. 27 is a cross sectional view of a reactor and lift device according to still another embodiment of the disclosed invention.

FIG. 27 illustrates a cross-sectional side view of another embodiment in accordance with the disclosed technology. This particular embodiment includes a performance-improving components that may be added individually or collectively to the embodiment seen in FIG. 25. This is a means (1132) to return biogas from the top of the reactor vessel (1180) to somewhere under the collar of the surge lifting device (1182), to increase the surge, e.g. mixing frequency of the surge lifting device (1182). Side baffles can also be installed to collect all gases generated below the gas collection collar to improve the mixing.

Figure 28:
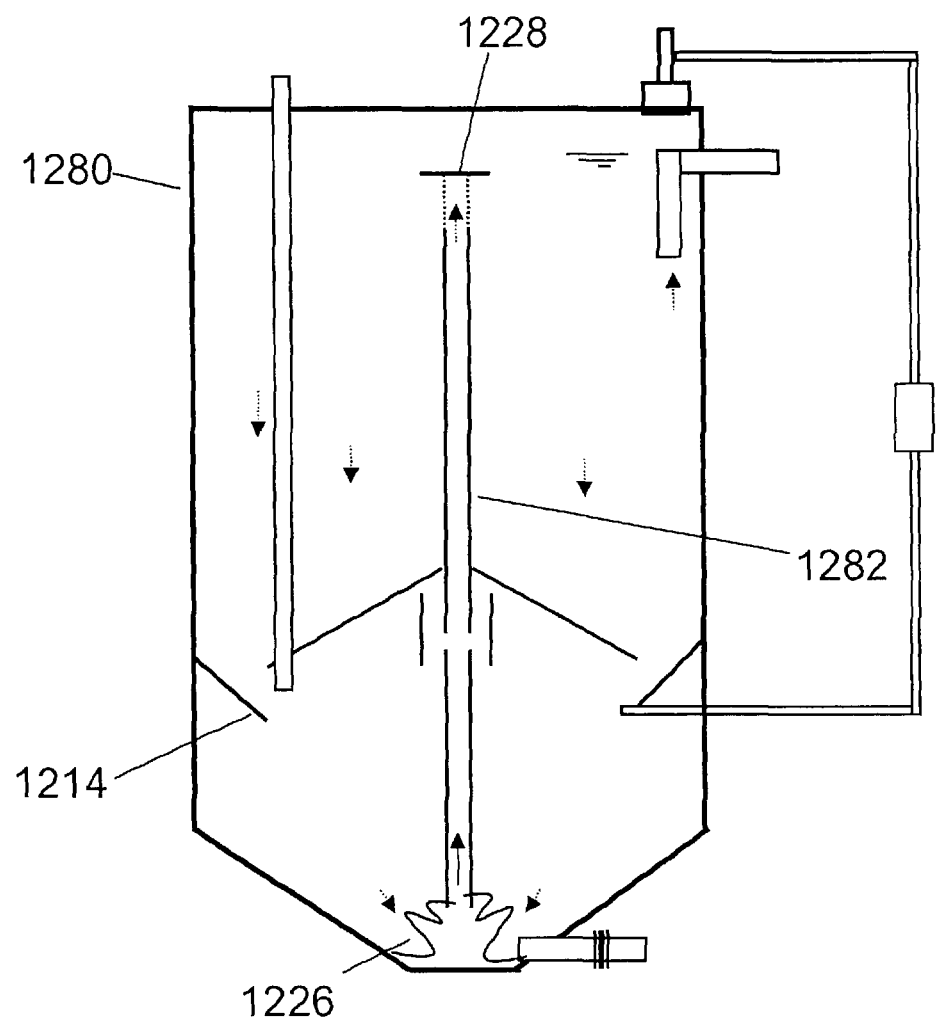
FIG. 28 is a cross sectional view of a reactor and lift device according to yet another embodiment of the disclosed invention.

FIG. 28 illustrates a cross-sectional side view of yet another embodiment in accordance with the disclosed technology. In addition to the components shown in FIGS. 25 and 27, FIG. 28 shows the side baffle (1214) which is used to collect all gas generated bellow the gas collection collar. In addition, the surge lifting device (1282) is connected to the tank through a spring mechanism (1226). This spring mechanism can also be on the top of the surge lifting device. Moreover, a force mitigation plate (1228) is installed above the outlet of the surge lifting device (1282), to reduce the impact of surge to the top of the reaction vessel (1280). When the surge hit the mitigation plate (1228), it will provide an impact to the entire surge lifting device (1282) and make it vibrate, enhancing the mixing.

Figure 29:
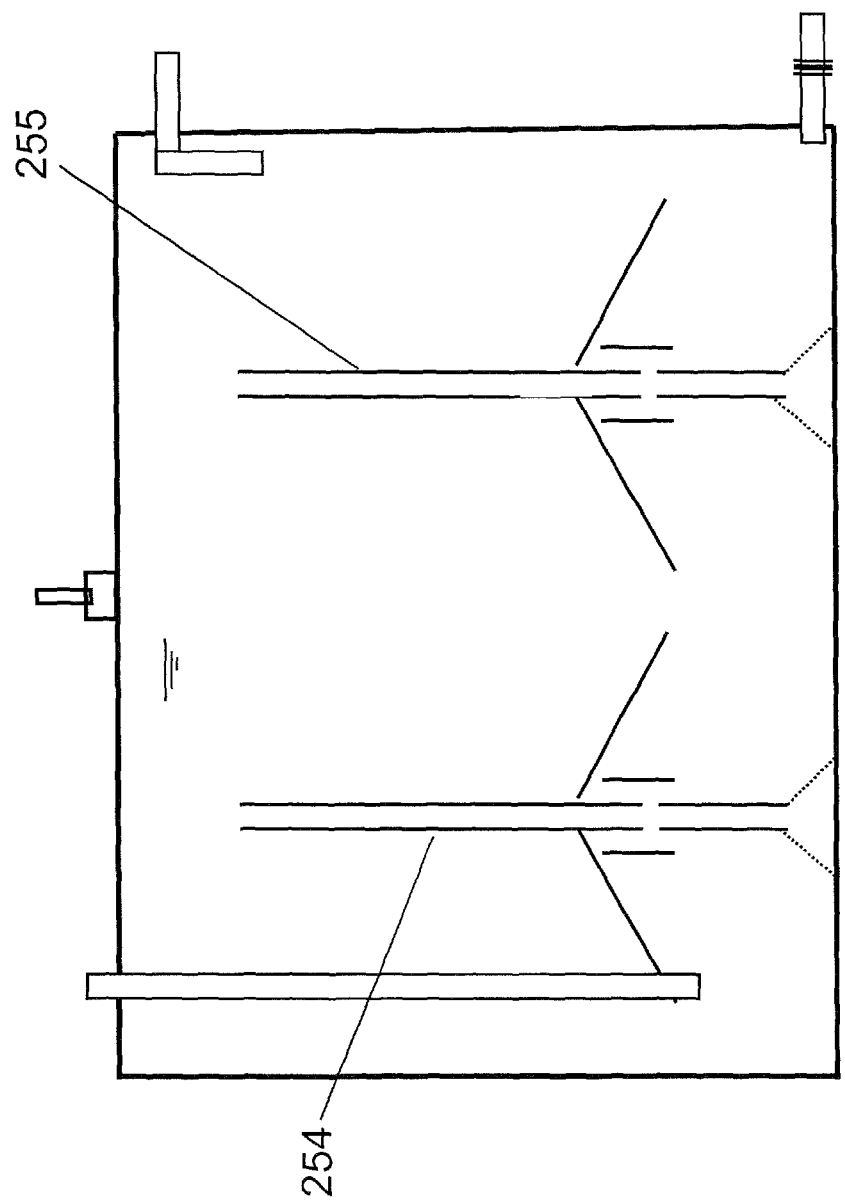
FIG. 29 is a cross sectional view of a reactor and lift device according to yet another embodiment of the disclosed invention.

FIG. 29 illustrates a cross-sectional side view of still another embodiment in accordance with the disclosed technology. This embodiment shows how multiple mixing devices (254, 255) can be situated next to each other in the same volume to improve performance or when fabricating larger reactors.

Figure 30:
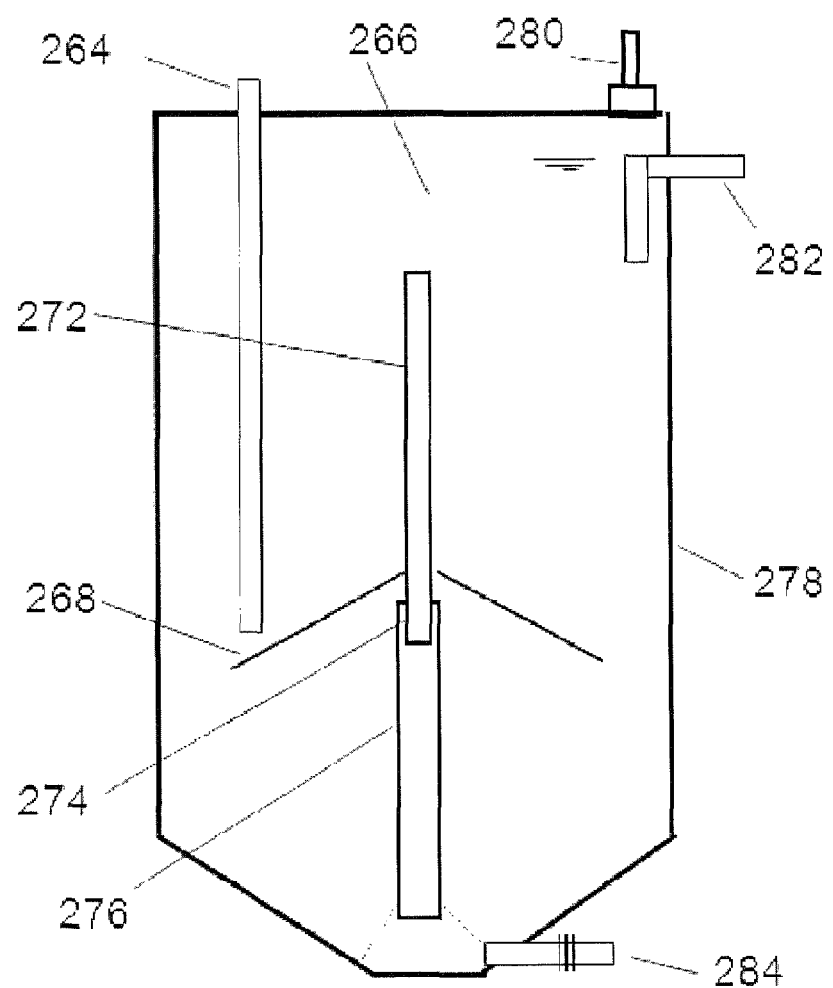
FIG. 30 is a cross sectional view of a reactor and lift device according to another embodiment of the disclosed invention.

FIG. 30 illustrates a cross-sectional side view of another embodiment in accordance with the disclosed technology. This particular embodiment shows an automatic mixing device such as that disclosed in previous embodiments. Feed is introduced into the reactor via inlet (264). There it mixes with, and is consumed by, anaerobic bacteria which produce useful gas, such as methane, as a metabolic byproduct. As gas bubbles generated under the gas collection collar they float upward, and are captured by the gas collection collar (268). The gas expands in volume until it reaches the bottom of the upper riser (272). At this point the gas flows through the gas conduit (274) created by the lower riser (276) extending over the upper riser (272), and into the upper riser (272). As the gas travels through the upper riser (272) it pulls solids from the bottom of the reactor and deposits them at the top, effectively mixing the reactor. Accumulated gas leaves the reactor via gas outlet (280). Effluent from the reactor leaves through the outlet (282), and the reactor can be drained through the drain (284). All of the optional components described in the discussion of FIGS. 25-29 may be included in this embodiment as well.

Operation

Embodiments in FIGS. 5 and 6 are operated in such a way so that wastewater first enters the bioreactor through the inlet and enters one or more mixing zones. Organic carbon in the influent is used as the electron donor during the denitrification process and nitrate or nitrite is converted into nitrogen gas. If no nitrate or nitrite is present then the influent carbon is utilized to prime phosphorous accumulating organisms by encouraging them to release more phosphorous in preparation to uptake a net increase in phosphorous once they are exposed to aerobic conditions. In aerobic zone organic matter degradation is achieved and ammonia is converted to nitrate and/or nitrite. Settled sludge containing nitrate and/or nitrite must be returned from the static zone to seed the aerobic zone and the zone.

Microorganisms are retained within the reactor via static zone and solids return (automatic or forced). Additional solids-liquid separation may be performed downstream of the reactor for final polishing (if desired), but it is typically unnecessary to return sludge from the polishing unit to the reactor. The aeration system can be controlled based on the ammonia concentration within the aeration tank, which indicates the extent of the organic matter degradation. Once the ammonia is less than a set value, the aeration can be reduced. If the ammonia is greater than a set value, the aeration can be increased. If the aeration is controlled based on ammonia, the DO concentration in the aeration zone will change. Therefore, DO can be used as an indicator for sludge wasting—if the DO is lower than a set value, sludge should be wasted. If the sludge wasting is set at a constant rate, it can be stopped if the DO is greater than a set value.

The embodiment in FIG. 7 is an alternating reactor. The aeration device in this embodiment is typically operated in an alternating on and off pattern. When the aeration device is not in operation the mixing device is turned on through a alternating timer. Therefore the aeration/mixing zone is operated in aerobic and anoxic conditions at different times (the mixing can also be on all the time if needed). The inflow may also be pumped into the reactor only when the aeration is off, to allow the reactor operated in batch fashion. Doing so provides a carbon source from the raw influent to drive denitrification. Extending the non-aeration period could encourage the growth of PAOs therefore this embodiment has the potential to biologically remove phosphorus. As with embodiments in FIGS. 5 and 6, the majority of solids are retained within the reactor. A clarifier or other polishing method may be used downstream from this reactor, but solids return from the polishing device is typically not necessary. If an aeration tank is added to treat the effluent from the embodiment, it can help remove residual ammonia and improve phosphorus uptake by the biomass carried out by the effluent from the reactor. The aeration for the alternating aeration on/off zone can also be controlled by ammonia concentration in the alternating aeration on/off zone as described earlier.

The embodiment in FIG. 8 has a continuous mixing zone upstream of the alternating aeration on/off zone, which may be under anaerobic or anoxic conditions, depending on the operational condition of the alternating aeration on/off zone and the influent strength. When the aeration device is on, the mixing zone may be under anoxic condition. However, when the aeration device is off, the mixing zone may be under anaerobic condition. Therefore, the mixing zone is operated under anaerobic and anoxic conditions, while the alternating aeration on/off zone is operated under anoxic and oxic conditions. In this embodiment flow is applied directly to the mixing zone from the inlet. The installation of this mixing zone will encourage the growth of PAOs in addition to denitrification, therefore has the phosphorus removal capability and also the denitrification capability. Because the mixing zone is maintained in mixing condition all the time, it will also have better denitrification kinetics than that disclosed in FIG. 7. Sludge is recycled to the mixing zone from the static zone either directly or through the alternating aeration on/off zone. A polishing clarifier may be used downstream from this reactor to remove solids from the effluent of the reactor. In addition, an aerobic tank can be added between the FIG. 8 reactor and the polishing clarifier to improve phosphorus uptake by PAOs, and help remove residual ammonia in the effluent. The aeration for the alternating aeration on/off zone can also be controlled based on the ammonia concentration within the zone.

The embodiment in FIG. 9 is operated similarly as that shown in FIG. 8. However, since it has a detached clarifier, a separate sludge return device is needed to return sludge to the one of the preceding zones (mixing zone or alternating aeration on/off zone). If the return flow rate from the clarifier to the mixing zone is appropriate, the internal mixed liquor return from the alternating aeration on/off zone to the mixing zone can be eliminated. This type of arrangement is useful for large scale applications when one-tank construction is not possible. This design is especially useful to upgrade the existing treatment plants for N and P removal.

Embodiments in FIGS. 10-24 operate through the collection of gas in a chamber until a critical volume is reached. The gas then evacuates the chamber and enters a riser at once, which pushes and pulls liquid and solids within or under the riser. The gas provided to the device can be derived either from an gas line or by collecting gas bubbles from under the device as they rise. If the latter method is employed the bubbles can come from a diffuser, an open gas line, or can nucleate from the liquid.

Embodiments in FIGS. 25 through 30 operate under anaerobic conditions. Feed comprising waste sludge from wastewater treatment plants, human waste, animal waste, or any highly active organic slurry can be used to drive the reactor. The efficiency of the mixing device is dependant on the activeness of the feed and the temperature of the reactor. When the reactor is fed through the inlet an equal volume of effluent can be expected from the outlet. Gas is collected once it leaves the gas outlet and can be stored, burned, or processed for other uses as an energy source.

Reaction vessels, biological reactors, and the like which incorporate one or more of the technologies disclosed herein may exhibit some or all of the following advantages over existing reaction devices:

(a) In the bioreactor of this invention, more sludge can be returned back to the reaction zone through the internal settling mechanism, thus the microorganism concentration in the bioreactor can be increased relative to conventional suspended-growth bioreactors. As a result, the performance and effluent quality of the bioreactor can be improved.

(b) Because of the increase of the microorganism concentration, the bioreactor of this invention can be operated in a higher volumetric loading, resulting in the reduced bioreactor size and reduced construction cost.

(c) In the bioreactor of this invention, the internal sludge return function replaces the sludge returned from the secondary clarifier, thus the external sludge return from the clarifier can be eliminated, resulting in simplified operation and reduced energy consumption for sludge return.

(d) The elimination of sludge return from the secondary clarifier allows only the excess sludge to be carried to the secondary clarifier, thereby reduces the clarifier solids loading and improves the clarifier effluent quality.

(e) Since the invention can be easily implemented, existing suspended-growth bioreactors such as aeration tanks can be easily modified to the bioreactor of this invention by adding baffles to create an internal sludge return and pre-anoxic zone(s). Thus, the capacity of the existing wastewater treatment plants that employ suspended-growth bioreactors such as activated sludge wastewater treatment plants can be increased for very low modification cost. This avoids very costly major expansions of the existing plants and the construction of new plants once the design capacity of the existing plants is reached. Lagoons can also be modified or upgraded using this invention, by adding a reactor of the present invention as a pre-treatment or post-treatment unit of the lagoon, to significantly reduce the pollutant load of the lagoon.

(f) Adding multiple anoxic/aerobic zone combinations and dosing each anoxic zone with a portion of the influent will allow the reactor to provide comprehensive total nitrogen removal through nitrification/denitrification. Because of denitrification, the process recycles the oxygen in the nitrate and nitrite forms, which further reduces the oxygen demand. Therefore, energy cost for aeration can be reduced. Moreover, the denitrification reduces the nitrate and nitrite concentrations in the effluent, resulting in the improved effluent quality.

(g) By implementing an alternating aeration on/off function, the influent organic matter can be utilized to perform denitrification in the same tank at different times, especially when the raw wastewater is fed to the reactor when the aeration is off. Therefore, no external carbon addition is needed to achieve comprehensive total nitrogen removal through the aerobic-anoxic cycling process, resulting in significant savings in operation costs.

(h) Using a single volume to apply both aerobic and anoxic treatment simplifies the construction and operation, leading to significant cost savings from construction, operation, and maintenance.

(i) When the non-aeration period is extended to form anaerobic conditions, biological phosphorus removal can also be achieved, resulting in comprehensive wastewater treatment using the same volume, with minimum construction, operation, and maintenance costs.

(j) As a result of more intensive mixing than a conventional biogas generators through the use of the surge lifting device, the present invention can achieve a higher rate, and makes it possible to use a smaller reactor to treat the equivalent amount of organic waste or realize a greater gas production and more complete digestion than if the same sized conventional digester is used.

(k) Due to the self-actuating mixing function, the present invention eliminates energy inputs needed to mix reactor. Therefore, net energy output is higher when compared to other biogas generators. It also allows reactor to be operated off-grid in rural or undeveloped regions.

(l) Lack of mechanical mixing devices reduces operational and maintenance inputs to the reactor. This, combined with the smaller size requirement, reduces capital and operational costs of other reactors. It extends the viable market of the reactor to undeveloped countries.

(m) The surge lifting device, in this case the pump riser and gas collection collar, not only results in more comprehensive mixing of the entire reactor, but also prevents sludge build up at the digester bottom, and also helps to break up the floating sludge within the digester, thereby improving the digester performance while reducing the need to clean the digester regularly.

(n) The conduit with three-way connection design of the surge lifting device could eliminate the potential for clogging of the surge lifting device in certain applications.

(o) Large bubbles created by the surge lifting device reduce oxygen transfer from the bubbles to the surrounding liquid so that anoxic or even anaerobic conditions can be maintained within the liquid.

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

What is claimed is:

1. A biological reactor apparatus for treating water and wastewater comprising:
 (a) a tank having one inlet and one outlet;
 (b) a means of retaining biomass within the tank;
 (c) an alternating aeration on/off zone comprising a means of aeration and a separate means of mixing, wherein said alternating aeration on/off zone comprises a single area;
 (d) wherein said means of aeration operates on an alternating on and off pattern;

(e) wherein said means of mixing operates at least when said means of aeration is off;

(f) wherein said means of retaining biomass is fixed or moving media.

2. The apparatus of claim 1, further comprising a mixing zone containing a means of mixing upstream of said alternating aeration on/off zone and is connected to the inlet of the tank, and a means to return the tank contents from said alternating aeration on/off zone to said mixing zone.

* * * * *